US012704921B2

(12) United States Patent
Ko et al.

(10) Patent No.: US 12,704,921 B2
(45) Date of Patent: Aug. 11, 2026

(54) DISPLAY DEVICE AND ELECTRONIC DEVICE HAVING THE SAME

(71) Applicant: Samsung Display Co., Ltd., Yongin-si (KR)

(72) Inventors: Gyung-Min Ko, Yongin-si (KR); Seongjun Lee, Yongin-si (KR); Cheolku Kang, Yongin-si (KR); Yong-Hwan Park, Yongin-si (KR); Sanghyun Jun, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/268,665

(22) Filed: Jul. 14, 2025

(65) Prior Publication Data

US 2026/0044229 A1 Feb. 12, 2026

(30) Foreign Application Priority Data

Aug. 9, 2024 (KR) ........................ 10-2024-0106575

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04106* (2013.01); *G06F 2203/04107* (2013.01)

(58) Field of Classification Search
CPC ............... G06F 3/04164; G06F 3/0446; G06F 2203/04106; G06F 2203/04107; G06F 3/0412; G06F 3/0445; G06F 2203/04111; G06F 3/0443; G06F 3/046;
(Continued)

(56) References Cited

U.S. PATENT DOCUMENTS 8,723,413 B2 5/2014 Chen
10,126,864 B2 11/2018 Jeong et al.
10,474,279 B2 11/2019 Hwang et al.
(Continued)

FOREIGN PATENT DOCUMENTS

JP 2023-541724 A 10/2023
KR 10-2018-0036466 A 4/2018
(Continued)

*Primary Examiner* — Premal R Patel

(74) *Attorney, Agent, or Firm* — Womble Bond Dickinson (US) LLP

(57) ABSTRACT

Provided is a display device including a display panel, and an input sensor including a charging electrode in a sensing region and configured to generate an induced magnetic field, a first trace line in a peripheral region adjacent to the sensing region and electrically connected to the charging electrode, an inorganic layer covering the charging electrode, a first organic layer above the inorganic layer, a sensing electrode in the sensing region above the inorganic layer, and a second organic layer above the first organic layer and overlapping the sensing electrode, wherein the first trace line includes a (1-1)-th line portion below the inorganic layer, a (1-2)-th line portion between the inorganic layer and the first organic layer, and electrically connected to the (1-1)-th line portion, and a (1-3)-th line portion between the first organic layer and the second organic layer, and electrically connected to the (1-2)-th line portion.

20 Claims, 19 Drawing Sheets

(58) Field of Classification Search
CPC ...... G06F 3/04162; G06F 3/047; H02J 50/10; H02J 50/00; H10K 59/40
See application file for complete search history.

(56) References Cited

U.S. PATENT DOCUMENTS

| | | | | |
|---|---|---|---|---|
| 11,301,074 | B2 | 4/2022 | Lee et al. | |
| 11,422,664 | B2 | 8/2022 | Kim et al. | |
| 11,635,835 | B2 | 4/2023 | Lee et al. | |
| 11,995,280 | B2 | 5/2024 | Long | |
| 2018/0182819 | A1* | 6/2018 | Jo | G06F 3/0412 |
| 2019/0079633 | A1 | 3/2019 | Kim et al. | |
| 2021/0141477 | A1 | 5/2021 | Yang et al. | |
| 2022/0052129 | A1* | 2/2022 | Kim | H10K 59/121 |
| 2022/0187979 | A1* | 6/2022 | Jung | G06F 3/0446 |
| 2022/0255353 | A1 | 8/2022 | Kim et al. | |
| 2022/0404931 | A1* | 12/2022 | Kim | G06F 3/04164 |
| 2023/0049665 | A1* | 2/2023 | Lim | G06F 3/04166 |
| 2023/0067179 | A1* | 3/2023 | Kim | G06F 3/04164 |
| 2023/0280856 | A1 | 9/2023 | Lius et al. | |
| 2023/0329020 | A1 | 10/2023 | Bae et al. | |
| 2024/0008339 | A1 | 1/2024 | Sung et al. | |

FOREIGN PATENT DOCUMENTS

| | | | |
|---|---|---|---|
| KR | 10-1929281 | B1 | 12/2018 |
| KR | 10-2021-0057862 | A | 5/2021 |
| KR | 10-2021-0142036 | A | 11/2021 |
| KR | 10-2410267 | B1 | 6/2022 |
| KR | 10-2022-0097048 | A | 7/2022 |
| KR | 10-2023-0144689 | A | 10/2023 |
| KR | 10-2648676 | B1 | 3/2024 |

* cited by examiner 200
200-DA:100-DA
200-NDA:100-NDA
SL1
SL2
SL3
SL
SL2-1
SL2-2
SL2
E1-1~E1-4
E2-1~E2-8
SE
E2-8
E2-7
CRE
E2-6
CP
E2-5
E2-4
LP
SP2
E2-3
CP2
E2-2
E2-1
SL2-2
ESD
PDE
SL3
SL1
SL3
SL2-1
E1-1
SP1
CP1
E1-2
UA
E1-3
E1-4
DR1
DR2
DR3

DISPLAY DEVICE AND ELECTRONIC DEVICE HAVING THE SAME

CROSS-REFERENCE TO RELATED APPLICATION

The present application claims priority to, and the benefit of, Korean Patent Application No. 10-2024-0106575, filed on Aug. 9, 2024, in the Korean Intellectual Property Office, the entire disclosure of which is incorporated herein by reference.

BACKGROUND

The present disclosure herein relates to a display device including an input sensor, and an electronic device including the same.

Multimedia electronic devices, such as televisions, mobile phones, tablet computers, laptops, navigation devices, and game consoles include a display device for displaying an image. In addition to typical input methods using a button, a keyboard, a mouse, etc., the electronic devices may include a sensor layer (or, an input sensor) capable of providing a touch-based input method which enables a user to input information or a command suitably, intuitively, and conveniently. The sensor layer may sense a user's touch or pressure. Meanwhile, a demand for the use of a pen for a precise touch input for a user who is familiar with information input using a writing instrument or for a specific application program (for example, an application program for sketching or drawing) is increasing.

SUMMARY

The present disclosure provides a display device capable of sensing inputs from different types of input means.

The present disclosure also provides an electronic device including the display device described above.

One or more embodiments provide a display device including a display panel, and an input sensor above the display panel, and including a charging electrode in a sensing region, and configured to generate an induced magnetic field, a first trace line in a peripheral region adjacent to the sensing region, and electrically connected to the charging electrode, an inorganic layer covering the charging electrode, a first organic layer above the inorganic layer, a sensing electrode in the sensing region above the inorganic layer, and a second organic layer above the first organic layer, and overlapping the sensing electrode, wherein the first trace line includes a (1-1)-th line portion below the inorganic layer, a (1-2)-th line portion between the inorganic layer and the first organic layer, and electrically connected to the (1-1)-th line portion, and a (1-3)-th line portion between the first organic layer and the second organic layer, and electrically connected to the (1-2)-th line portion.

At least one of the (1-1)-th line portion, the (1-2)-th line portion, or the (1-3)-th line portion may include a first metal layer, a second metal layer above the first metal layer, and thicker than the first metal layer, and a third metal layer above the second metal layer, thinner than the second metal layer, and including a same material as the first metal layer.

The second metal layer may be narrower than the first metal layer and the third metal layer in a plan view.

The sensing electrode may include first electrodes extending in a first direction, and arranged in a second direction crossing the first direction, and second electrodes extending in the second direction, and arranged in the first direction, and wherein the charging electrode includes line portions respectively overlapping the second electrodes.

The charging electrode may further include a connection portion connecting first ends of the line portions, wherein the first trace line is provided in plurality, the first trace lines respectively connected to second ends of the line portions.

The input sensor may further include (2-2)-th trace lines respectively connected to second ends of the first electrodes, and (2-1)-th trace lines respectively connected to first ends of the first electrodes, and including a (2-1)-th line portion below the inorganic layer, a (2-2)-th line portion between the inorganic layer and the first organic layer and connected to the (2-1)-th line portion, and a (2-3)-th line portion between the first organic layer and the second organic layer, and electrically connected to the (2-2)-th line portion.

The (2-1)-th line portion and the (2-2)-th line portion may be connected via a first contact hole penetrating the inorganic layer, wherein the (2-2)-th line portion and the (2-3)-th line portion are connected via a second contact hole penetrating the first organic layer.

The first contact hole and the second contact hole might not overlap.

The input sensor may further include (2-2)-th trace lines respectively connected to second ends of the first electrodes, and (2-1)-th trace lines respectively connected to first ends of the first electrodes, and including a (2-1)-th line portion below the inorganic layer, a (2-2)-th line portion between the inorganic layer and the first organic layer, and connected to the (2-1)-th line portion, and a (2-3)-th line portion between the first organic layer and the second organic layer, and connected to the (2-1)-th line portion.

The input sensor may further include third signal lines respectively connected to one end of the second electrodes.

The input sensor may further include an electrostatic discharge line in the peripheral region, and including line portions at different respective layers and electrically connected to each other.

The display panel may include light-emitting regions, and a non-light-emitting region adjacent to the light-emitting regions, wherein openings corresponding to the light-emitting regions are defined in the sensing electrode.

The display device may further include a pad electrode electrically connected to an end portion of the first trace line, and including a first conductive pattern directly on the end portion of the first trace line, and a second conductive pattern connected to the first conductive pattern via a contact hole penetrating the inorganic layer and the first organic layer, and wherein the inorganic layer and the first organic layer are between the first conductive pattern and the second conductive pattern.

The charging electrode may include a (1-1)-th line component below the inorganic layer, and a (1-2)-th line component between the inorganic layer and the first organic layer, and electrically connected to the (1-1)-th line component.

The sensing electrode may include first electrodes extending in a first direction and arranged in a second direction crossing the first direction, and second electrodes extending in the second direction, arranged in the first direction, having an integrated shape, and having a length that is less than a length of the first electrodes. Each of the first electrodes includes sensing portions between the first organic layer and the second organic layer, and connection portions between the inorganic layer and the first organic layer, and connecting adjacent ones of the sensing portions.

One or more embodiments provide a display device including a display panel, and an input sensor above the display panel, and including a charging electrode in a sensing region, and configured to generate an induced magnetic field, an inorganic layer covering the charging electrode, a first organic layer above the inorganic layer, a sensing electrode in the sensing region above the inorganic layer, a second organic layer above the first organic layer, and covering the sensing electrode, and a trace line in a peripheral region adjacent to the sensing region, electrically connected to a corresponding electrode among the charging electrode and the sensing electrode, and including a (1-1)-th line portion below the inorganic layer, a (1-2)-th line portion between the inorganic layer and the first organic layer, and electrically connected to the (1-1)-th line portion, and a (1-3)-th line portion between the first organic layer and the second organic layer, and electrically connected to the (1-2)-th line portion.

The (1-1)-th line portion and the (1-2)-th line portion may include a first metal layer, a second metal layer above the first metal layer, and a third metal layer above the second metal layer, and including a same material as the first metal layer, wherein the second metal layer is thicker than the first metal layer and the third metal layer, and wherein the second metal layer narrower than the first metal layer and the third metal layer in a plan view.

The sensing electrode may include first electrodes extending in a first direction, and arranged in a second direction crossing the first direction, and second electrodes extending in the second direction, and arranged in the first direction, wherein the charging electrode includes line portions respectively overlapping the second electrodes.

One or more embodiments provide an electronic device including an input means, and a display device including a display panel, and an input sensor above the display panel, and including a charging electrode in a sensing region, and configured to generate an induced magnetic field for charging the input means, a first trace line in a peripheral region adjacent to the sensing region, and electrically connected to the charging electrode, an inorganic layer covering the charging electrode, a first organic layer above the inorganic layer, a sensing electrode in the sensing region above the inorganic layer, and a second organic layer above the first organic layer, and covering the sensing electrode, and wherein the first trace line includes a (1-1)-th line portion below the inorganic layer, a (1-2)-th line portion between the inorganic layer and the first organic layer, and electrically connected to the (1-1)-th line portion, and a (1-3)-th line portion between the first organic layer and the second organic layer, and electrically connected to the (1-2)-th line portion.

The input means may include an RLC resonant circuit configured to be charged by the induced magnetic field.

BRIEF DESCRIPTION OF THE DRAWINGS

The accompanying drawings are included to provide a further understanding of the present disclosure, and are incorporated in, and constitute a part of, this specification. The drawings illustrate embodiments of the present disclosure and, together with the description, serve to explain aspects of the present disclosure. In the drawings.

DETAILED DESCRIPTION

Figure 1:
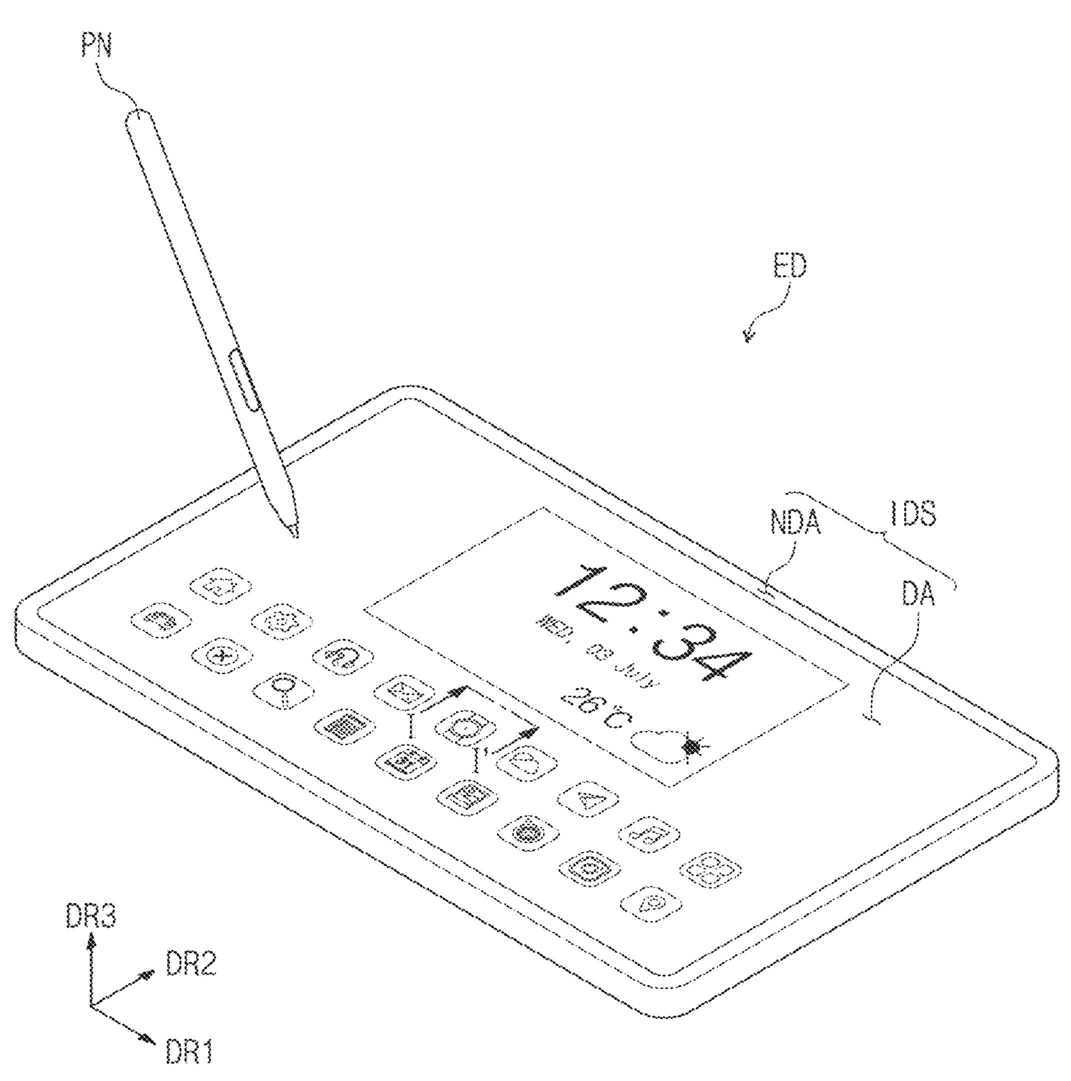
FIG. 1 is a perspective view of an electronic device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like.

Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B.

Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5 % of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure. " Furthermore, the expression "being the same" may mean "being substantially the same". In other words, the expression "being the same" may include a range that can be tolerated by those of ordinary skill in the art. The other expressions may also be expressions from which "substantially" has been omitted.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of an electronic device ED according to one or more embodiments of the present disclosure. As illustrated in FIG. 1, the electronic device ED may display an image through a display surface IDS. The display surface IDS is parallel to a plane defined by a first direction DR1 and a second direction DR2. A third direction DR3 indicates a normal direction of the display surface IDS, that is, a thickness direction of the electronic device ED.

A front surface (or an upper surface) and a rear surface (or a lower surface) of each of members or units to be described below are divided by the third direction DR3. However, the first to third directions DR1, DR2, and DR3 may be simply an example, and one or more embodiments of the present disclosure is not limited thereto.

In one or more embodiments of the present disclosure, the electronic device ED including a flat display surface IDS is illustrated, but one or more embodiments of the present disclosure is not limited thereto. The electronic device ED may include a curved display surface or a three-dimensional display surface IDS. The three-dimensional display surface IDS may include a plurality of display regions indicating different directions, and may include, for example, a bent display surface. The electronic device ED may be a foldable electronic device ED capable of being folded. The electronic device ED may be a tablet terminal, but one or more embodiments of the present disclosure is not limited thereto.

As illustrated in FIG. 1, the display surface IDS includes an image region DA in which an image is displayed and a bezel region NDA adjacent to the image region DA. The bezel region NDA is a region in which an image is not displayed. FIG. 1 illustrates icon images as an example of the image. As illustrated in FIG. 1, the image region DA may have a substantially quadrangular shape. The wording "substantially quadrangular shape" represents not only a quadrangular shape in terms of mathematics but also a quadrangular shape in which not a vertex but a curved boundary is defined in a vertex region (or corner region). The bezel region NDA may surround the image region DA. However, one or more embodiments of the present disclosure is not limited thereto, and a shape of the bezel region NDA may be changed. For example, the bezel region NDA may be located on only one side of the image region DA.

Figure 2:
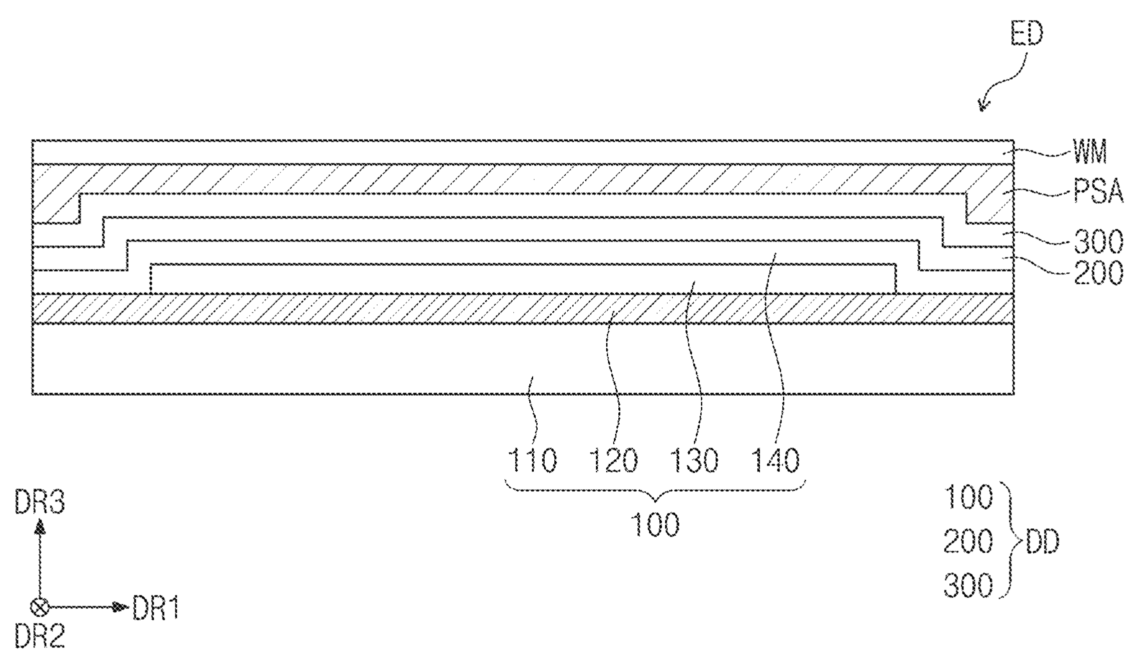
FIG. 2 is a cross-sectional view of an electronic device according to one or more embodiments of the present disclosure.

FIG. 2 is a cross-sectional view of an electronic device ED according to one or more embodiments of the present disclosure. Some components of the electronic device ED are either omitted from, or not illustrated in, FIG. 2.

The electronic device ED may include a display device DD, and a window WM located on the display device DD (as used herein, "located on" may mean "above"). The display device DD and the window WM may be coupled to each other by an adhesive layer PSA. According to one or more embodiments of the present disclosure, the window WM may be formed or provided in contact with the display device DD by using a coating method, and in this case, the adhesive layer PSA may be omitted.

The display device DD may include a display panel 100, an input sensor 200, and an anti-reflective layer 300. The display panel 100 may include a base layer 110, a driving element layer 120, a light-emitting element layer 130, and a thin-film encapsulation layer 140.

The driving element layer 120 is located on an upper surface of the base layer 110. The base layer 110 may be a flexible substrate capable of being bent, folded, rolled, etc. The base layer 110 may be a glass substrate, a metal substrate, a polymer substrate, or the like. However, one or more embodiments of the present disclosure is not limited thereto, and the base layer 110 may be an inorganic layer, an organic layer, or a composite material layer. The base layer 110 substantially has the same shape as the display panel 100.

The base layer 110 may have a multi-layered structure. For example, the base layer 110 may include a first synthetic resin layer, a second synthetic resin layer, and inorganic layers located therebetween. The first and second synthetic resin layers may each include a polyimide (PI)-based resin, and one or more embodiments of the present disclosure is not particularly limited.

The driving element layer 120 may be located on the base layer 110. The driving element layer 120 may include a plurality of insulating layers, a plurality of semiconductor patterns, a plurality of conductive patterns, signal lines, and the like. The driving element layer 120 may include a pixel driving circuit.

The light-emitting element layer 130 may be located on the driving element layer 120. The light-emitting element layer 130 may include a light-emitting element. For example, the light-emitting element may include an organic light-emitting material, an inorganic light-emitting material, an organic-inorganic light-emitting material, a quantum dot, a quantum rod, a micro-LED, or a nano-LED.

The thin-film encapsulation layer 140 may be located on the light-emitting element layer 130. The thin-film encapsulation layer 140 may protect the light-emitting element layer 130, that is, the light-emitting element, from moisture, oxygen, and foreign substances, such as dust particles. The thin-film encapsulation layer 140 may include at least one inorganic encapsulation layer. The thin-film encapsulation layer 140 may include a stacked structure of a first inorganic encapsulation layer/an organic encapsulation layer/a second inorganic encapsulation layer.

The input sensor 200 may be directly located on the display panel 100. The input sensor 200 may sense an external input by, for example, using an electromagnetic induction method and/or a capacitive method. The input sensor 200 may sense both an input from a user's body and an input from an input means, which generates a magnetic field of a corresponding resonant frequency.

The input sensor 200 may be formed or provided on the display panel 100 through a continuous process. Here, the wording "directly located" may mean that a third element is not located between the input sensor 200 and the display panel 100. For example, a separate adhesive layer may not be located between the input sensor 200 and the display panel 100.

The anti-reflective layer 300 reduces reflectance for external light incident from above the window WM. The anti-reflective layer 300 according to one or more embodiments of the present disclosure may include a retarder and a polarizer. The retarder may be a film-type retarder or a liquid crystal coating-type retarder and include a λ/2 retarder and/or a λ/4 retarder. The polarizer may be also a film-type polarizer or a liquid crystal coating-type polarizer. The film type may include a stretchable synthetic resin film, and the liquid crystal coating type may include liquid crystals arranged in corresponding arrangement (e.g., predetermined arrangement). The retarder and the polarizer may further include a protective film. The retarder and the polarizer as themselves or the protective film may be defined as a base layer of the anti-reflective layer 300.

The anti-reflective layer 300 according to one or more embodiments of the present disclosure may include color filters. The color filters have corresponding arrangement (e.g., predetermined arrangement). Arrangement of a plurality of groups of color filters classified by a color may be determined in consideration of arrangement of a plurality of groups of pixels classified by a color of emitted light. The anti-reflective layer 300 may further include a black matrix adjacent to the color filters. The anti-reflective layer 300 including the color filters may be directly located on the display panel 100.

The window WM according to one or more embodiments of the present disclosure may include a base layer and a light-blocking pattern. The base layer may include a glass substrate, a synthetic resin film, and/or the like. The light-blocking pattern partially overlaps the base layer. The light-blocking pattern may be located on a rear surface of the base layer and substantially define the bezel region NDA (see FIG. 1) of the electronic device ED. A region in which the light-blocking pattern is not located may define the image region DA (see FIG. 1) of the electronic device ED.

In one or more embodiments, the electronic device ED further includes a bracket and a chassis (or case) coupled to the window WM. In addition, the electronic device ED may further include a main board located below the display device DD and substantially located between the display device DD and the chassis. In the electronic device ED, an electronic module mounted on a main board, a camera module, a power module, etc., may be further located in the chassis.

Figure 3A:
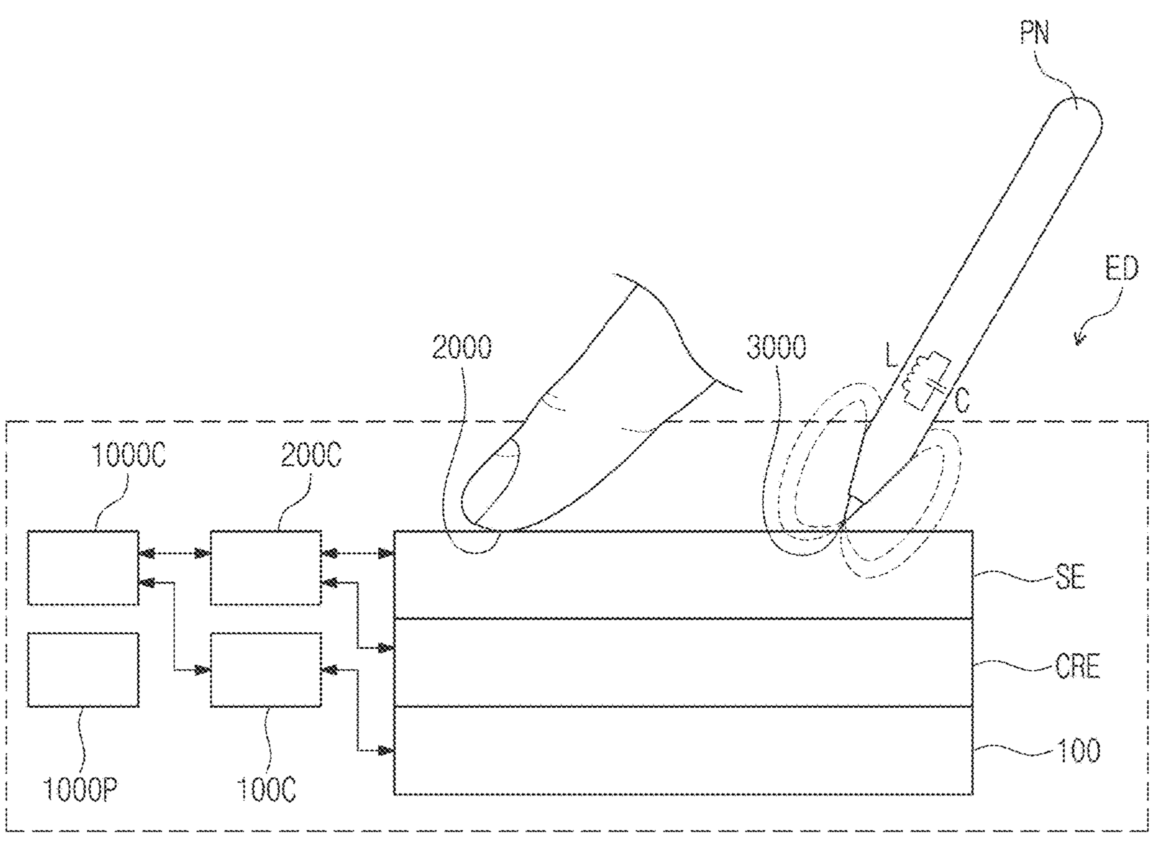
FIG. 3A is a diagram for describing an operation of an electronic device according to one or more embodiments of the present disclosure.
Figure 3B:
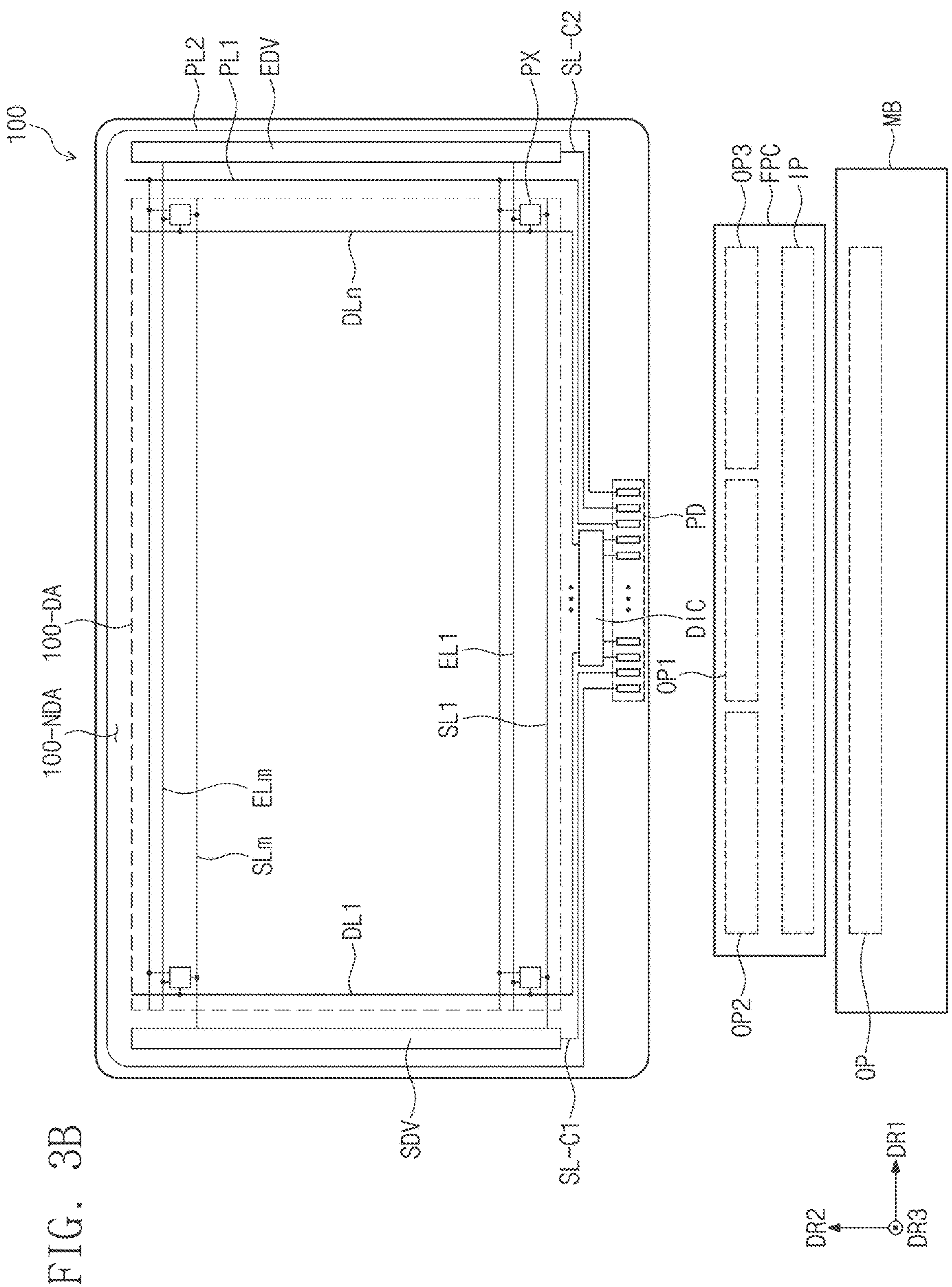
FIG. 3B is a plan view of a display panel according to one or more embodiments of the present disclosure.

FIG. 3A is a diagram for describing an operation of an electronic device ED according to one or more embodiments of the present disclosure. FIG. 3B is a plan view of a display panel 100 according to one or more embodiments of the present disclosure.

Referring to FIG. 3A, the electronic device ED may include a display panel 100, an input sensor 200, a first driving circuit (e.g., display-panel-driving circuit) 100C, a second driving circuit 200C, a main driving circuit 1000C, and a power circuit 1000P.

The input sensor 200 may sense a first input 2000 or a second input 3000 different from each other. The first input 2000 may be from an input means capable of providing a change in capacitance of a sensing electrode SE, and the second input 3000 may be from an input means capable of forming or generating induced current in the sensing electrode SE. For example, the first input 2000 may be from an input means capable of providing a charge. The second input 3000 may be an input from a pen PN or an input from an RFIC tag. For example, the pen PN may be a passive-type pen or an active-type pen.

In one or more embodiments of the present disclosure, the pen PN may be a device that outputs a magnetic field of a corresponding resonant frequency (e.g., predetermined resonant frequency). The pen PN may be configured to transmit an output signal based on an electromagnetic resonance method. The pen PN may be referred to as an input pen, a magnetic pen, a stylus pen, or an electromagnetic resonance pen.

The pen PN may include an RLC resonant circuit, and the RLC resonant circuit may include an inductor L and a capacitor C. In one or more embodiments of the present disclosure, the RLC resonant circuit may be a variable resonant circuit that varies a resonant frequency. In this case, the inductor L may be a variable inductor and/or the capacitor C may be a variable capacitor, but one or more embodiments of the present disclosure is not particularly limited thereto.

The inductor L generates current due to a magnetic field (hereinafter, an induced magnetic field) induced in a charging electrode CRE. However, one or more embodiments of the present disclosure is not particularly limited thereto. For example, in a case in which the pen PN operates as an active type, the pen PN may generate current even if the pen PN is not provided with a magnetic field from the outside. The generated current is transmitted to the capacitor C. The capacitor C is charged with current input from the inductor L and discharges charged current to the inductor L. Thereafter, the inductor L may emit a magnetic field of a resonant frequency. Induced current may flow through the sensing electrode SE due to a magnetic field emitted by the pen PN and may be transmitted to the second driving circuit 200C as a reception signal (or sensing signal).

The main driving circuit 1000C may control an overall operation of the electronic device ED. For example, the main driving circuit 1000C may control an operation of the driving circuit 100C of a display panel (hereinafter, a first driving circuit) and the driving circuit 200C of an input sensor (e.g., a sensor-driving circuit hereinafter, a second driving circuit). The main driving circuit 1000C may include at least one microprocessor and may further include a graphics controller. The main driving circuit 1000C may be referred to as an application processor, a central processing unit, or a main processor.

The first driving circuit 100C may drive the display panel 100. The first driving circuit 100C may receive image data and a control signal from the main driving circuit 1000C. The control signal may include various signals. For example, the control signal may include an input vertical synchronization signal, an input horizontal synchronization signal, a main clock, a data enable signal, and the like.

The second driving circuit 200C may drive the input sensor 200. The second driving circuit 200C may receive a control signal from the main driving circuit 1000C. The control signal may include a clock signal of the second driving circuit 200C. In addition, the control signal may further include a mode determination signal, which determines a driving mode of the input sensor 200 and the second driving circuit 200C.

The second driving circuit 200C may be embodied as an integrated circuit (IC) and electrically connected to the input sensor 200. For example, the second driving circuit 200C may be directly mounted in a corresponding region (e.g., predetermined region) of the display panel 100 or mounted on a separate printed circuit board using a chip-on-film (COF) method and electrically connected to the input sensor 200.

The second driving circuit 200C may selectively operate the input sensor 200 in a first mode or a second mode. For example, the first mode may be a mode for sensing a touch input, for example, the first input 2000. The second mode may be a mode for sensing an input from the pen PN, for example, the second input 3000. The first mode may be referred to as a touch-sensing mode, and the second mode may be referred to as a pen-sensing mode. The second driving circuit 200C may operate the charging electrode CRE in the second mode.

Switching between the first mode and the second mode may be performed in various ways. For example, the input sensor 200 may be driven in the first mode and the second mode in a time-division manner and sense the first input 2000 and the second input 3000. The charging electrode CRE may stop operating in the first mode and may operate for a corresponding period (e.g., predetermined period) in the second mode.

The second driving circuit 200C may calculate coordinate information about an input on the basis of a signal received from the sensing electrode SE, and may provide a coordinate signal having coordinate information to the main driving circuit 1000C. The main driving circuit 1000C executes an operation corresponding to a user's input on the basis of the coordinate signal. For example, the main driving circuit 1000C may operate the first driving circuit 100C so that a new application image is displayed on the display panel 100.

The power circuit 1000P may include a power management integrated circuit (PMIC). The power circuit 1000P may generate a plurality of driving voltages for driving the display panel 100, the input sensor 200, the first driving circuit 100C, and the second driving circuit 200C. For example, the plurality of driving voltages may include a gate high voltage, a gate low voltage, a first driving voltage (for example, ELVSS voltage), a second driving voltage (for example, ELVDD voltage), an initialization voltage, and the like, but are not particularly limited to the examples.

As illustrated in FIG. 3B, the display panel 100 may include a plurality of pixels PX, a scan-driving circuit SDV, an emission-driving circuit EDV, a plurality of signal lines, and a plurality of pad electrodes PD. The plurality of pixels PX are located in a display region 100-DA. A driving chip DIC mounted in a non-display region 100-NDA may include a data driving circuit. The display region 100-DA may correspond to the image region DA of FIG. 1, and the non-display region 100-NDA may correspond to the bezel region NDA. In the present disclosure, the wording "a region or a portion corresponds to a region or a portion" means that regions or portions overlap and is not necessarily limited to a case in which two different regions or portions have the same shape and the same area. In one or more embodiments of the present disclosure, the data driving circuit may be also integrated to the display panel 100 like the scan-driving circuit SDV and the emission-driving circuit EDV.

The plurality of signal lines may include a plurality of scan lines SL1 to SLm, a plurality of data lines DL1 to DLn, a plurality of emission lines EL1 to ELm, first and second control lines SL-C1 and SL-C2, and first and second power lines PL1 and PL2. m and n are natural numbers equal to or greater than 2.

The scan lines SL1 to SLm may extend in the first direction DR1 and may be electrically connected to the pixels PX and the scan-driving circuit SDV. The data lines DL1 to DLn may extend in the second direction DR2 and may be electrically connected to the pixels PX and the driving chip DIC. The emission lines EL1 to ELm may extend in the first direction DR1 and may be electrically connected to the pixels PX and the emission-driving circuit EDV.

The first power line PL1 receives a first power voltage, and the second power line PL2 receives a second power voltage having a lower level than the first power voltage. In one or more embodiments, a second electrode (for example, a cathode) of a light-emitting element is electrically connected to the second power line PL2.

The first control line SL-C1 may be electrically connected to the scan-driving circuit SDV, and may extend toward a lower end of the display panel 100. The second control line SL-C2 may be electrically connected to the emission-driving circuit EDV, and may extend toward the lower end of the display panel 100. The pad electrodes PD may be located in the non-display region 100-NDA adjacent to the lower end of the display panel 100 and may be more adjacent to the lower end of the display panel 100 than the driving chip DIC. The pad electrodes PD may be electrically connected to the driving chip DIC and some signal lines.

The scan-driving circuit SDV may generate a plurality of scan signals, and the scan signals may be applied to the pixels PX through the scan lines SL1 to SLm.

The driving chip DIC may generate a plurality of data voltages, and the data voltages may be applied to the pixels PX through the data lines DL1 to DLn. The emission-driving circuit EDV may generate a plurality of emission signals, and the emission signals may be applied to the pixels PX through the emission lines EL1 to ELm. The pixels PX may be provided with the data voltages in response to the scan signals. The pixels PX may display an image by emitting light having luminance corresponding to the data voltages in response to the emission signals.

FIG. 3B illustrates a circuit board FPC electrically bonded to the pad electrodes PD. The circuit board FPC may be a flexible circuit board. The circuit board FPC may include a first output pad region OP1 bonded to the pad electrodes PD. The circuit board FPC may include a third output pad region OP3 and a second output pad region OP2 bonded to a pad electrode PDE of FIG. 5. The circuit board FPC may include an input pad region IP electrically bonded to a main circuit board MB. A plurality of pad electrodes may be located in each of the first output pad region OP1, the second output pad region OP2, the third output pad region OP3, and the input pad region IP. The first output pad region OP1, the second output pad region OP2, and the third output pad region OP3 may be each connected to the input pad region IP through a signal line.

The main circuit board MB may include an output pad region OP corresponding to the input pad region IP. Various electronic components including a main processor and an auxiliary processor may be mounted on the main circuit board MB.

Figure 4:
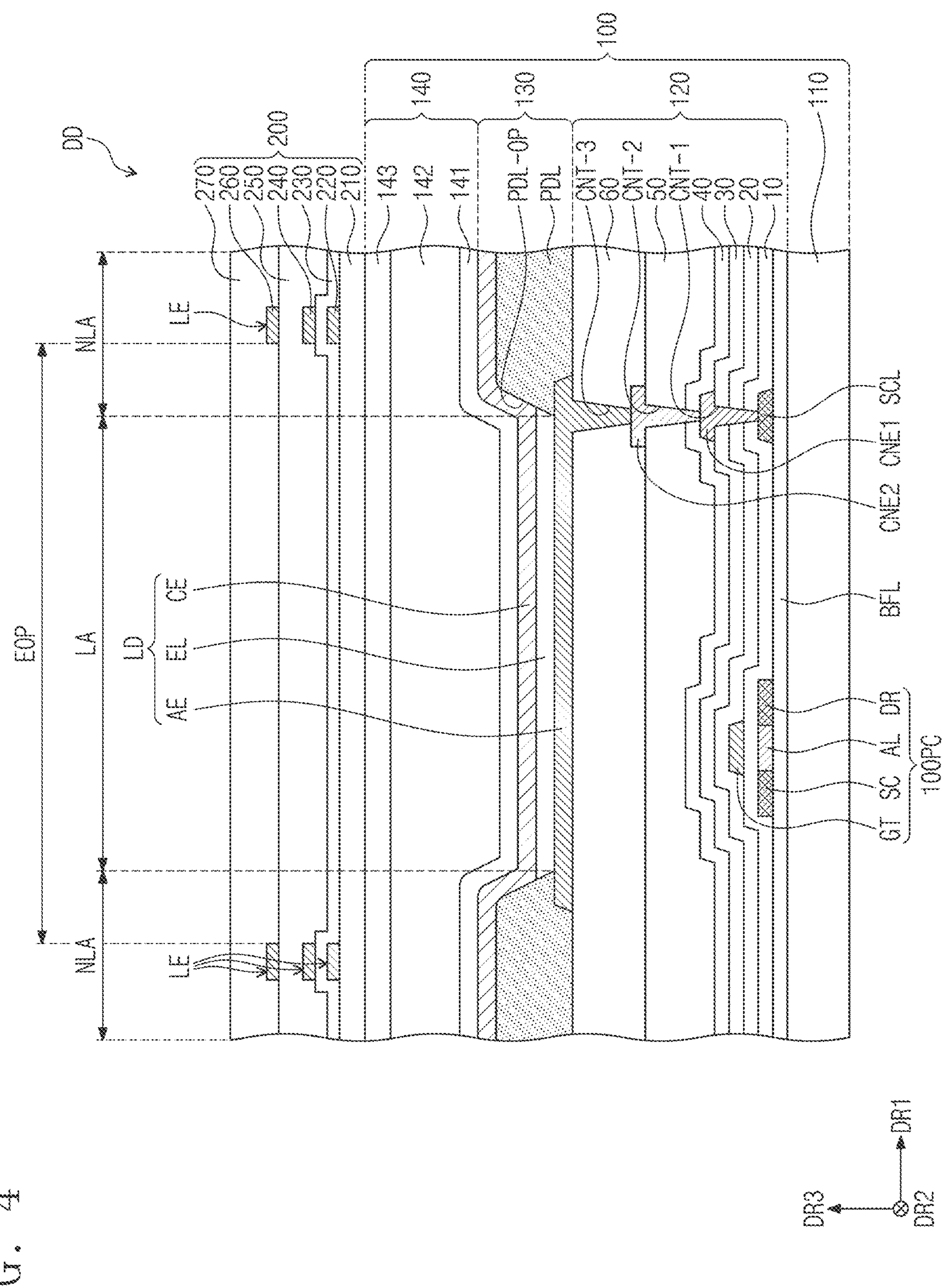
FIG. 4 is a cross-sectional view of a display device according to one or more embodiments of the present disclosure.

FIG. 4 is a cross-sectional view of a display device DD according to one or more embodiments of the present disclosure. The anti-reflective layer 300 of FIG. 2 omitted from, or is not illustrated in, FIG. 4.

Referring to FIG. 4, at least one buffer layer BFL is formed or provided on an upper surface of a base layer 110. The buffer layer BFL may improve bonding force between the base layer 110 and a semiconductor pattern. The buffer layer BFL may be formed of multiple layers. Alternatively, a display panel 100 may further include a barrier layer. The buffer layer BFL may include at least one of silicon oxide, silicon nitride, or silicon oxynitride. For example, the buffer layer BFL may include a structure in which a silicon oxide layer and a silicon nitride layer are alternately stacked.

A semiconductor pattern SC, AL, DR, and SCL may be located on the buffer layer BFL (as used herein, "located on" may mean "above"). The semiconductor pattern SC, AL, DR, and SCL may include polysilicon. However, one or more embodiments of the present disclosure is not limited thereto, and the semiconductor pattern SC, AL, DR, and SCL may include amorphous silicon, low-temperature polycrystalline silicon, or an oxide semiconductor.

FIG. 4 simply illustrates a partial semiconductor pattern SC, AL, DR, and SCL, and a semiconductor pattern may be further located in another region. The semiconductor pattern SC, AL, DR, and SCL may be arranged in accordance with a corresponding rule across the pixels PX (see FIG. 3B). The semiconductor pattern SC, AL, DR, and SCL may have a different electrical property according to whether the semiconductor pattern is doped or not. The semiconductor pattern SC, AL, DR, and SCL may include a first region SC, DR, and SCL having high conductivity and a second region AL having low conductivity. The first region SC, DR, and SCL may be doped with an N-type dopant or a P-type dopant. A P-type transistor may include a doped region doped with a P-type dopant, and an N-type transistor may include a doped region doped with an N-type dopant. The second region AL may be an undoped region or a region doped at a lower concentration than the first region SC, DR, and SCL.

The first region SC, DR, and SCL may have higher conductivity than the second region AL, and may substantially serve as an electrode or a signal line. The second region AL may substantially correspond to an active region AL (or channel) of a transistor 100PC. In other words, the second region AL of the semiconductor pattern SC, AL, DR, and SCL may be the active region AL of the transistor 100PC, another portion SC and DR may be a source region SC or a drain region DR of the transistor 100PC, and still another portion SCL may be a connection electrode or a connection signal line SCL.

The pixels PX (see FIG. 3B) may each have an equivalent circuit including a plurality of transistors, at least one capacitor, and at least one light-emitting element, and an equivalent circuit diagram of a pixel may be changed in various shapes. FIG. 4 illustrates one light-emitting element LD and one transistor 100PC included in the pixel PX (see FIG. 3B).

Figure 6A:
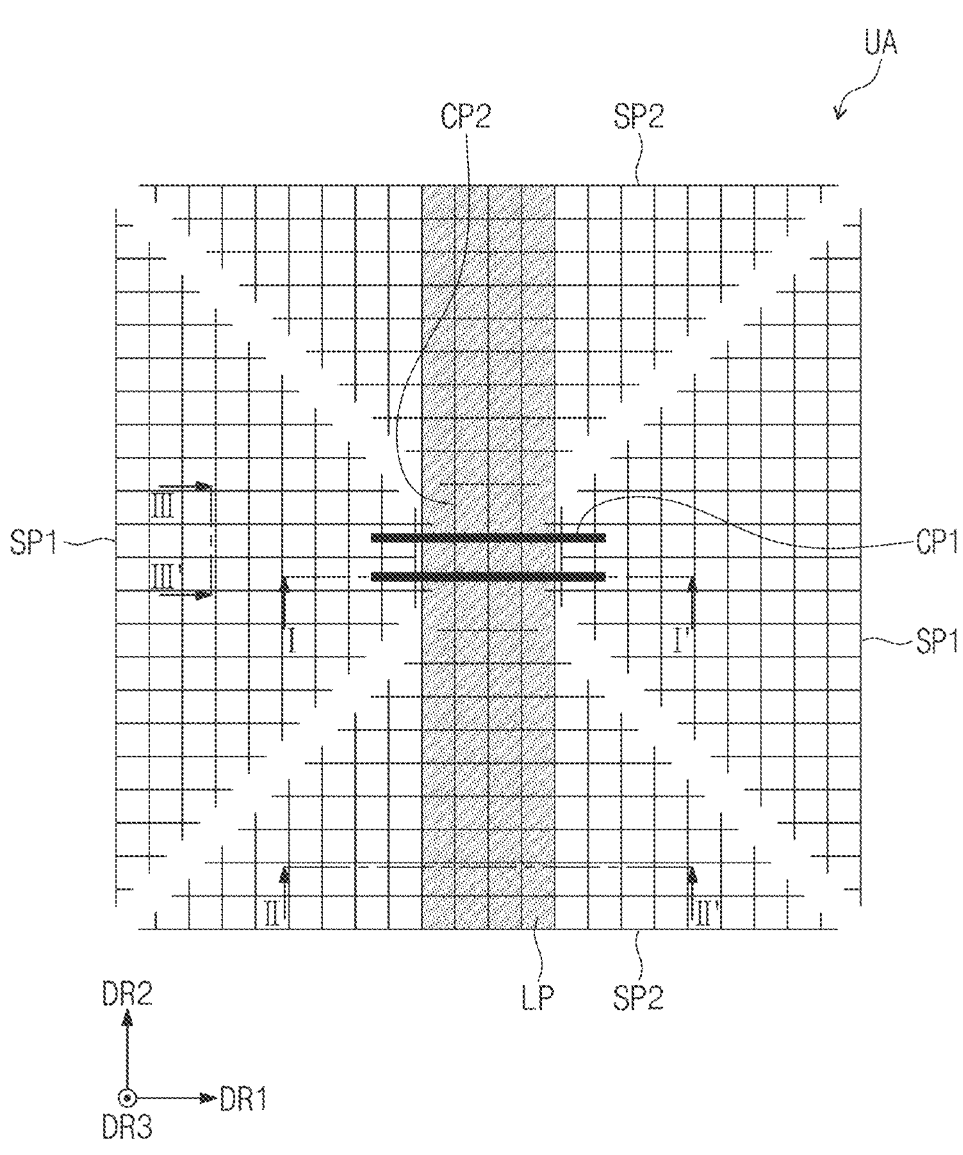
FIG. 6A is an enlarged plan view of a portion of FIG. 5.

The source region SC, the active region AL, and the drain region DR of the transistor 100PC may be formed from the semiconductor pattern SC, AL, DR, and SCL. The source region SC and the drain region DR may extend in opposite directions from the active region AL in a cross-sectional view. FIG. 6A illustrates a portion of the connection signal line SCL, which is formed from the semiconductor pattern SC, AL, DR, and SCL. In one or more embodiments, the connection signal line SCL may be electrically connected to the drain region DR of the transistor 100PC in a plan view.

A first insulating layer 10 may be located on the buffer layer BFL. The first insulating layer 10 may overlap the plurality of pixels PX (see FIG. 3B) in common and cover the semiconductor pattern SC, AL, DR, and SCL. The first insulating layer 10 may be an inorganic layer and/or an organic layer and have a single-layered or multi-layered structure. The first insulating layer 10 may include at least one of aluminum oxide, titanium oxide, silicon oxide, silicon nitride, silicon oxynitride, zirconium oxide, or hafnium oxide. The first insulating layer 10 may be a single-layered silicon oxide layer. Not only the first insulating layer 10 but also an insulating layer of a driving element layer 120 to be described later may be an inorganic layer and/or an organic layer and have a single-layered or multi-layered structure. The inorganic layer may include at least one of the materials described above, but is not limited thereto.

A gate GT of the transistor 100PC is located on the first insulating layer 10. The gate GT may be a portion of a metal pattern. The gate GT overlaps the active region AL. The gate GT may function as a mask in a process of doping or reducing the semiconductor pattern SC, AL, DR, and SCL.

A second insulating layer 20 may be located on the first insulating layer 10 and cover the gate GT. The second insulating layer 20 may overlap the pixels PX (see FIG. 3B) in common. A third insulating layer 30 may be located on the second insulating layer 20. A first connection electrode CNE1 may be located on the third insulating layer 30. The first connection electrode CNE1 may be connected to the connection signal line SCL via a contact hole CNT-1 penetrating the first, second, and third insulating layers 10, 20, and 30.

A fourth insulating layer 40 may be located on the third insulating layer 30. The fourth insulating layer 40 may cover the first connection electrode CNE1. A fifth insulating layer 50 may be located on the fourth insulating layer 40. The fifth insulating layer 50 may be an organic layer. A second connection electrode CNE2 may be located on the fifth insulating layer 50. The second connection electrode CNE2 may be connected to the first connection electrode CNE1 via a contact hole CNT-2 penetrating the fourth insulating layer 40 and the fifth insulating layer 50. A sixth insulating layer 60 may be located on the fifth insulating layer 50 and cover the second connection electrode CNE2. The sixth insulating layer 60 may be an organic layer.

A light-emitting element layer 130 may be located on the driving element layer 120. The light-emitting element layer 130 may include the light-emitting element LD. For example, the light-emitting element layer 130 may include an organic light-emitting material, an inorganic light-emitting material, an organic-inorganic light-emitting material, a quantum dot, a quantum rod, a micro-LED, or a nano-LED.

Hereinafter, the light-emitting element LD will be described as an organic light-emitting element as an example, but is not particularly limited thereto.

The light-emitting element LD may include a first electrode AE, an emission layer EL, and a second electrode CE. The first electrode AE may be connected to the second connection electrode CNE2 via a contact hole CNT-3 penetrating the sixth insulating layer 60.

A pixel-defining film PDL may be located on the sixth insulating layer 60 and cover a portion of the first electrode AE. An opening PDL-OP is defined in the pixel-defining film PDL. The opening PDL-OP of the pixel-defining film PDL exposes at least a portion of the first electrode AE.

The display region 100-DA (see FIG. 3B) may include a light-emitting region LA and a non-light-emitting region NLA adjacent to the light-emitting region LA. The non-light-emitting region NLA may surround the light-emitting region LA. The light-emitting region LA is defined in correspondence to a partial region of the first electrode AE exposed by the opening PDL-OP.

The emission layer EL may be located on the first electrode AE. The emission layer EL may be located in a region corresponding to the opening PDL-OP. FIG. 4 illustrates that the emission layer EL is located in the opening PDL-OP as an example, but one or more embodiments of the present disclosure is not particularly limited thereto. For example, the emission layer EL may extend to cover a portion of an upper surface of the pixel-defining film PDL and a side surface of the pixel-defining film PDL defining the opening PDL-OP.

In one or more embodiments of the present disclosure, the emission layer EL may be separately formed or provided in each of the pixels PX (see FIG. 3B). In a case in which the emission layer EL is separately formed or provided in each of the pixels, each of emission layers EL may emit light having at least one of blue, red, or green color. However, one or more embodiments of the present disclosure is not limited thereto, and the emission layer EL may have an integrated shape and may be included in a plurality of pixels in common. In this case, the emission layer EL may provide blue light or white light.

The second electrode CE may be located on the emission layer EL. The second electrode CE may have an integrated shape and may be included in the plurality of pixels PX (see FIG. 3B) in common.

In one or more embodiments of the present disclosure, a hole control layer may be located between the first electrode AE and the emission layer EL. The hole control layer may be located in common in the light-emitting region LA and the non-light-emitting region NLA. The hole control layer may include a hole transport layer and may further include a hole injection layer. An electron control layer may be located between the emission layer EL and the second electrode CE. The electron control layer may include an electron transport layer and may further include an electron injection layer. The hole control layer and the electron control layer may be formed or provided in common in a plurality of pixels by using an open mask or an inkjet process.

A thin-film encapsulation layer 140 may be located on the light-emitting element layer 130. The thin-film encapsulation layer 140 may include an inorganic layer, an organic layer, and an inorganic layer, which are sequentially stacked, but layers constituting the thin-film encapsulation layer 140 are not limited thereto.

An input sensor 200 may include three conductive layers and four insulating layers. The input sensor 200 may include a base insulating layer 210, a first conductive layer 220, an inorganic insulating layer 230 (hereinafter, an inorganic layer), a second conductive layer 240, a first organic insulating layer 250 (hereinafter, a first organic layer), a third conductive layer 260, and a second organic insulating layer 270 (hereinafter, a second organic layer). In one or more embodiments of the present disclosure, the base insulating layer 210 may be omitted.

FIG. 4 schematically illustrates a line component LE of the first conductive layer 220, a line component LE of the second conductive layer 240, and a line component LE of the third conductive layer 260. The line component LE of the third conductive layer 260 may define an opening region EOP corresponding to the light-emitting region LA.

The first conductive layer 220, the second conductive layer 240, and the third conductive layer 260 may each have a single-layered structure or a multi-layered structure in which layers are stacked along the third direction DR3. The first conductive layer 220 and the second conductive layer 240 may include line components that define an electrode in a mesh shape.

The first conductive layer 220, the second conductive layer 240, and the third conductive layer 260 having a multi-layered structure may include stacked metal layers. The first conductive layer 220, the second conductive layer 240, and the third conductive layer 260 may include a titanium layer, an aluminum layer located on the titanium layer, and a titanium layer located on the aluminum layer.

The first conductive layer 220, the second conductive layer 240, and the third conductive layer 260 may be each formed or provided through a photolithography process. A through-hole, or contact hole, may be formed or defined in the inorganic layer 230 to be described later through a photolithography process, and the line component LE of the first conductive layer 220 and the line component LE of the second conductive layer 240 may be connected via the through-hole. A through-hole may be formed or defined in the first organic layer 250 to be described later through an exposure and development process, and the line component LE of the second conductive layer 240 and the line component LE of the third conductive layer 260 may be connected via the through-hole.

The base insulating layer 210 may be directly located on the thin-film encapsulation layer 140. The base insulating layer 210 may include an organic layer or an inorganic layer. The base insulating layer 210 may include at least one of a silicon nitride layer, a silicon oxynitride layer, or a silicon oxide layer. The base insulating layer 210 may have a thickness of about 1000 Å to about 4000 Å and may be formed or provided through a deposition process.

The inorganic layer 230 may cover the first conductive layer 220. The inorganic layer 230 may include at least one of a silicon nitride layer, a silicon oxynitride layer, or a silicon oxide layer. The inorganic layer 230 may have a thickness of about 1000 Å to about 4000 Å and may be formed or provided through a deposition process.

The first organic layer 250 may cover the second conductive layer 240, and the second organic layer 270 may cover the third conductive layer 260. The first organic layer 250 and the second organic layer 270 may include at least one of an acrylic resin, a methacrylic resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. The first organic layer 250 and the second organic layer 270 may each have a thickness of about 5000 Å to about 25000 Å and may be formed or provided through a deposition process. The first organic layer 250 and the second organic layer 270 may each have different thicknesses in a region overlapping the line component LE and a region not overlapping the line component LE. The first organic layer 250 and the second organic layer 270 may each have a thickness of about 5000 Å to about 15000 Å in the region overlapping the line component LE, and a thickness of about 10000 Å to about 25000 Å in the region not overlapping the line component LE.

Figure 5:
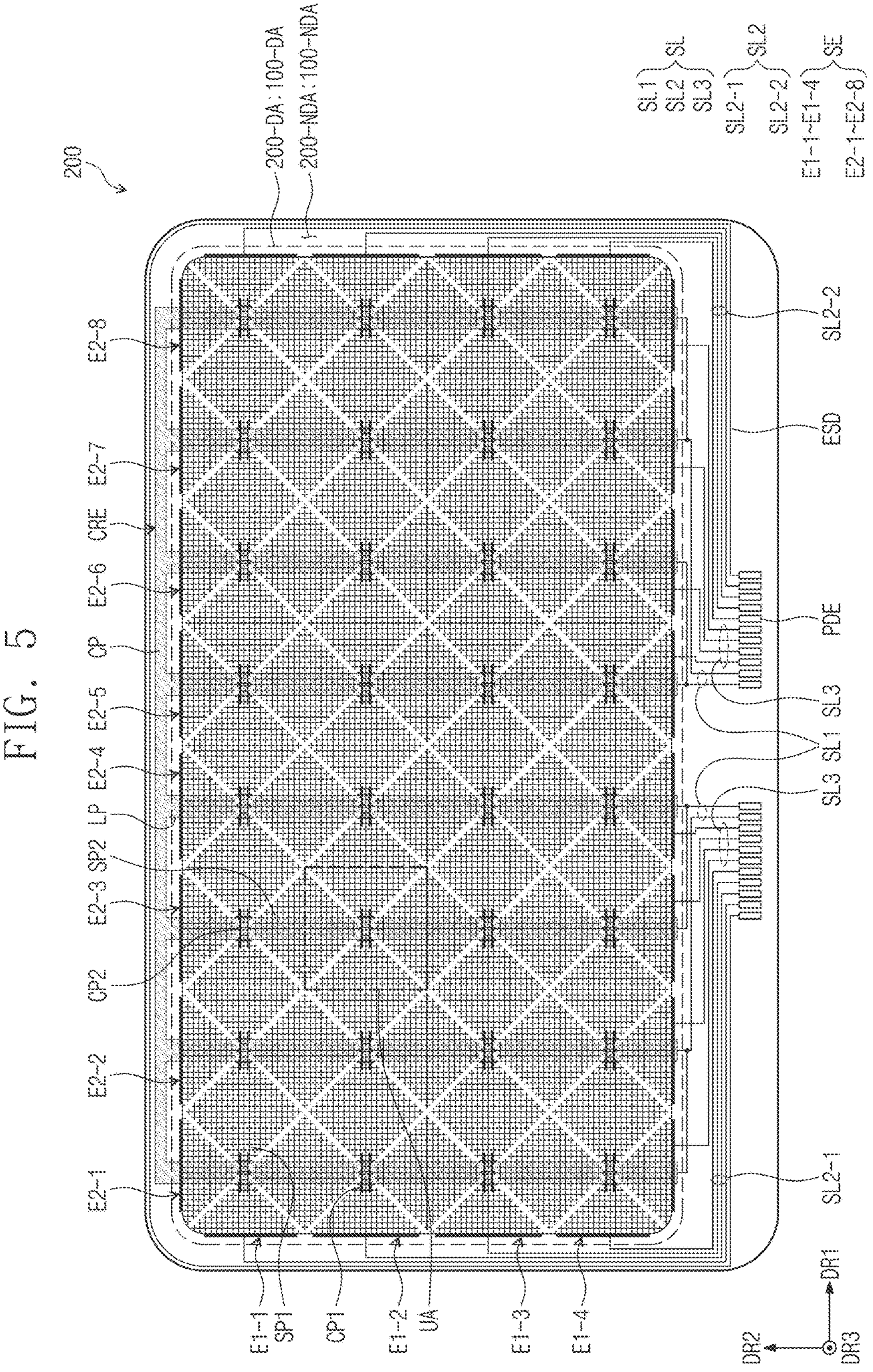
FIG. 5 is a plan view of an input sensor according to one or more embodiments of the present disclosure.

FIG. 5 is a plan view of an input sensor 200 according to one or more embodiments of the present disclosure.

As illustrated in FIG. 5, the input sensor 200 includes a sensing region 200-DA, and a peripheral region 200-NDA adjacent to the sensing region 200-DA. The sensing region 200-DA and the peripheral region 200-NDA respectively correspond to the display region 100-DA and the non-display region 100-NDA illustrated in FIG. 3B.

The input sensor 200 may include a charging electrode CRE, a sensing electrode SE, and a trace line SL electrically connected thereto. The sensing electrode SE may include first sensing electrodes E1-1 to E1-4 (hereinafter, first electrode(s)) and second sensing electrodes E2-1 to E2-8 (hereinafter, second electrode(s)), and the trace line SL may include first trace lines SL1, second trace lines SL2, and third trace lines SL3. A pad electrode PDE may be electrically connected to an end of the trace line SL.

The charging electrode CRE overlaps at least the sensing region 200-DA.

The charging electrode CRE includes line portions LP arranged along the first direction DR1 and each extending in the second direction DR2. The charging electrode CRE may further include a connection portion CP electrically connecting the line portions LP. Eight line portions LP and one connection portion CP electrically connecting all the eight line portions LP are illustrated, but one or more embodiments of the present disclosure is not limited thereto. It is illustrated that the connection portion CP overlaps the peripheral region 200-NDA, but one or more embodiments of the present disclosure is not limited thereto.

Each of the first trace lines SL1 is electrically connected to a corresponding line portion among the line portions LP. The line portions LP are located between the first trace lines SL1 and the connection portion CP in the second direction DR2.

As illustrated in FIG. 5, one first trace line SL1 may be electrically connected to two adjacent line portions LP. Two line portions LP form or provide one channel.

FIG. 5 illustrates eight line portions LP defining four channels.

A leftmost channel among the four channels may be defined as a first channel. The remaining three channels may be defined as a second channel, a third channel, and a fourth channel from the first channel to the right.

The charging electrode CRE may operate during a charge-driving mode of a second mode. In the charge-driving mode, the second driving circuit 200C (see FIG. 3A) may apply a first driving signal to any one of the first channel, the second channel, the third channel, or the fourth channel, and may apply a second driving signal to another channel. The first driving signal may be applied to the first channel, and the second driving signal may be applied to the second channel. The first driving signal may be applied in a manner of scanning from the first channel up to the third channel. The second driving signal may be a reverse phase signal of the first driving signal. For example, the first driving signal may be a sinusoidal signal. In one or more embodiments of the present disclosure, if the first driving signal is a square wave signal, the second driving signal may have a constant voltage (e.g., predetermined constant voltage). A channel to which a signal is not applied may be located between a channel to which the first driving signal is applied and a channel to which the second driving signal is applied.

A current path is formed by respectively applying the first driving signal and the second driving signal to two channels among the first channel, the second channel, the third channel, and the fourth channel. A channel that forms a current path in such a manner may be defined as a charging channel. Such a current path may have a coil form, and an RLC resonant circuit of the pen PN (see FIG. 3A) may be charged by an induced magnetic field that is formed by the current path.

The first electrodes E1-1 to E1-4 and the second electrodes E2-1 to E2-8 crossing each other, while being insulated from each other, overlap the sensing region 200-DA. The second trace lines SL2 electrically connected to the first electrodes E1-1 to E1-4, and the third trace lines SL3 electrically connected to the second electrodes E2-1 to E2-8, are located in the peripheral region 200-NDA. The second trace lines SL2 may include (2-1)-th trace lines SL2-1 respectively electrically connected to first ends of the first sensing electrodes E1-1 to E1-4, and (2-2)-th trace lines SL2 -2 respectively electrically connected to second ends of the first sensing electrodes E1-1 to E1-4. First ends of the second electrodes E2-1 to E2-8 are respectively electrically connected to the third trace lines SL3, and second ends of the second electrodes E2-1 to E2-8 are not electrically connected to a trace line. The third trace lines SL3 are located on a side opposite to the connection portion CP, and the sensing region 200-DA is located between the third trace lines SL3 and the connection portion CP.

The first electrodes E1-1 to E1-4 may each include sensing patterns SP1 (or first sensing portions) and bridge patterns CP1 (or connection patterns). Two adjacent sensing patterns SP1 may be electrically connected with two bridge patterns CP1, but the number of bridge patterns is not limited.

The second electrodes E2-1 to E2-8 may each include sensing portions SP2 (or second sensing portions) and intermediate portions CP2. The sensing portions SP2 may have a larger area than the intermediate portions CP2 and may have an approximately rhombic shape. Each of the intermediate portions CP2 is located between two adjacent sensing portions SP2 among the sensing portions SP2. A length of the intermediate portions CP2 may be relatively small, and the intermediate portions CP2 may be omitted. In this case, a sensing portion SP2 may directly extend from an adjacent sensing portion SP2.

The second electrodes E2-1 to E2-8 may each have an integrated shape.

That is, sensing portions SP2 and intermediate portions CP2 that form one second electrode are located on the same layer and formed or provided through the same etching process. In addition, the second electrodes E2-1 to E2-8 correspond to the line portions LP in one-to-one manner. The line portions LP each overlap a corresponding second electrode among the second electrodes E2-1 to E2-8.

According to one or more embodiments of the present disclosure, the first mode described with reference to FIG. 3A may be a mutual capacitance detection mode. In the mutual capacitance detection mode, a touch input is sensed by driving the first electrodes E1-1 to E1-4 and the second electrodes E2-1 to E2-8.

The second driving circuit 200C (see FIG. 3A) may sequentially provide a transmission signal (or driving signal) to the second electrodes E2-1 to E2-8, and may detect a coordinate based on the first input 2000 (see FIG. 3A) by using a reception signal (or sensing signal) that is detected through the first electrodes E1-1 to E1-4. For example, the second driving circuit 200C may sense a change in mutual capacitance between capacitively coupled first electrodes E1-1 to E1-4 and second electrodes E2-1 to E2-8 and calculate an input coordinate.

The charging electrode CRE, the first electrodes E1-1 to E1-4, and the second electrodes E2-1 to E2-8 may operate during a pen-sensing-driving mode of the second mode.

The RLC resonant circuit of the pen PN (see FIG. 3A) that is charged during the charge-driving mode of the second mode may emit a magnetic field of a resonant frequency while discharging charged charges. Induced current may be generated in the first electrodes E1-1 to E1-4 due to a magnetic field that is provided from the pen PN. The (2-1)-th trace lines SL2-1 and the (2-2)-th trace lines SL2 -2 electrically connected to two ends of each of the first electrodes E1-1 to E1-4 may form or provide a current path with the first electrodes E1-1 to E1-4. Values of current induced in the first electrodes E1-1 to E1-4 are measured, and coordinate information about the second input 3000 (see FIG. 3A) in the second direction DR2 is calculated.

At the same time, induced current may be generated in the second electrodes E2-1 to E2-8, and induced current may be generated in the line portions LP overlapping the second electrodes E2-1 to E2-8. A coupling capacitor is formed or generated between each of the second electrodes E2-1 to E2-8 and a corresponding line portion LP, and induced current that is formed or generated in the line portion LP may be transmitted to a corresponding second electrode through the coupling capacitor. The second driving circuit 200C (see FIG. 3A) measures values of induced current from the second electrodes E2-1 to E2-8 and calculates coordinate information about the second input 3000 (see FIG. 3A) in the first direction DR1.

Referring to FIG. 5, an electrostatic discharge line ESD may be located in the peripheral region 200-NDA.

Figure 6B:
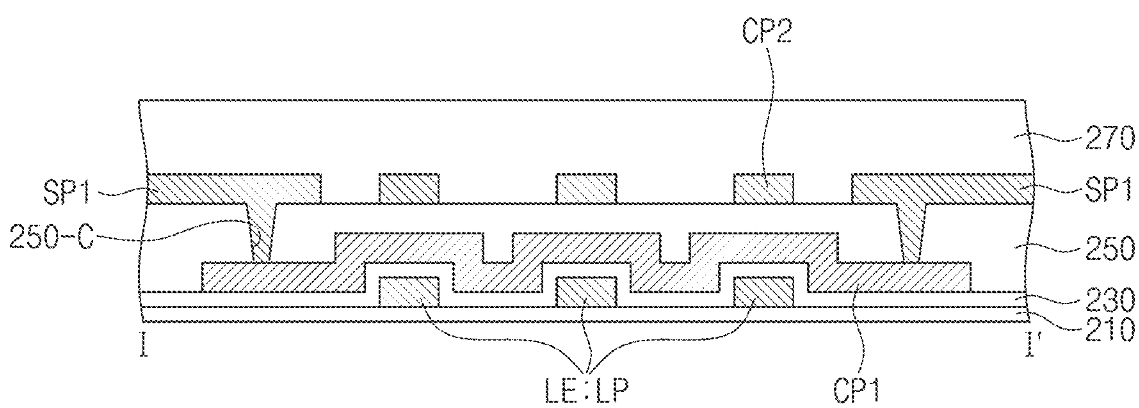
FIG. 6B is a cross-sectional view taken along the line I-I' of FIG. 6A.
Figure 6C:
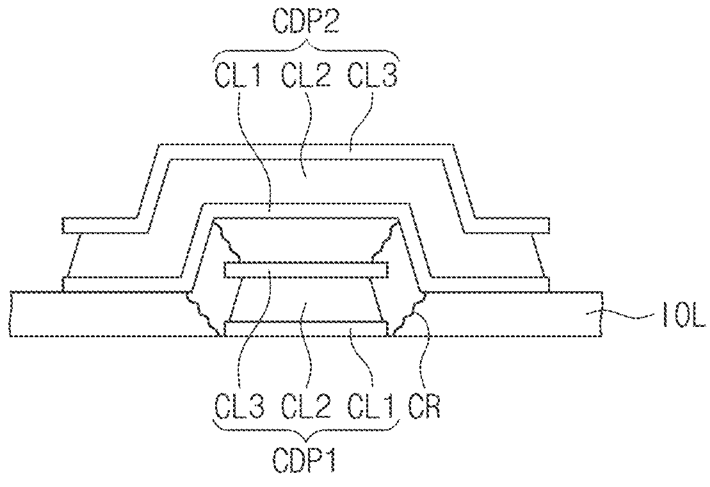
FIG. 6C is a cross-sectional view illustrating a short circuit fault between a first conductive pattern and a second conductive pattern.
Figure 6D:
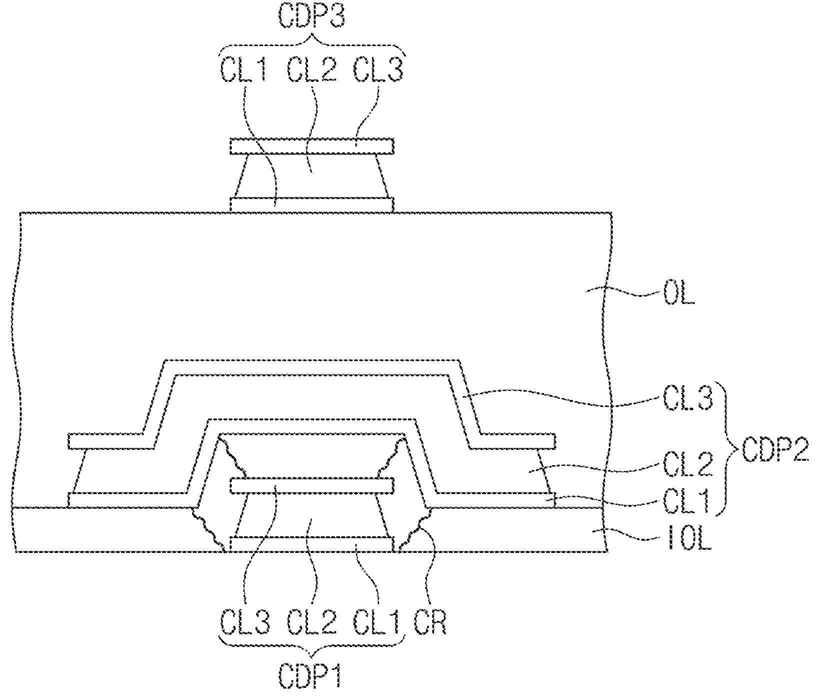
FIG. 6D is a cross-sectional view of a second conductive pattern and a third conductive pattern with no short circuit fault therebetween.
Figure 6E:
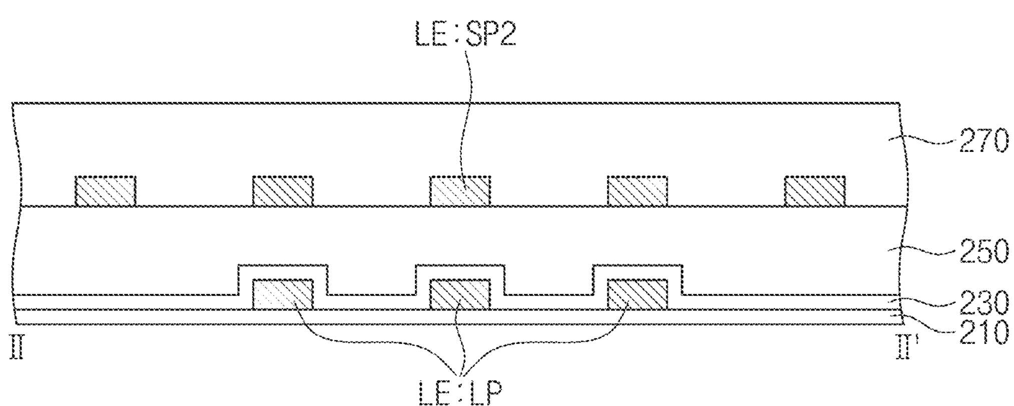
FIGS. 6E and 6F are cross-sectional views taken along the line II-II' of FIG. 6A.
Figure 6F:
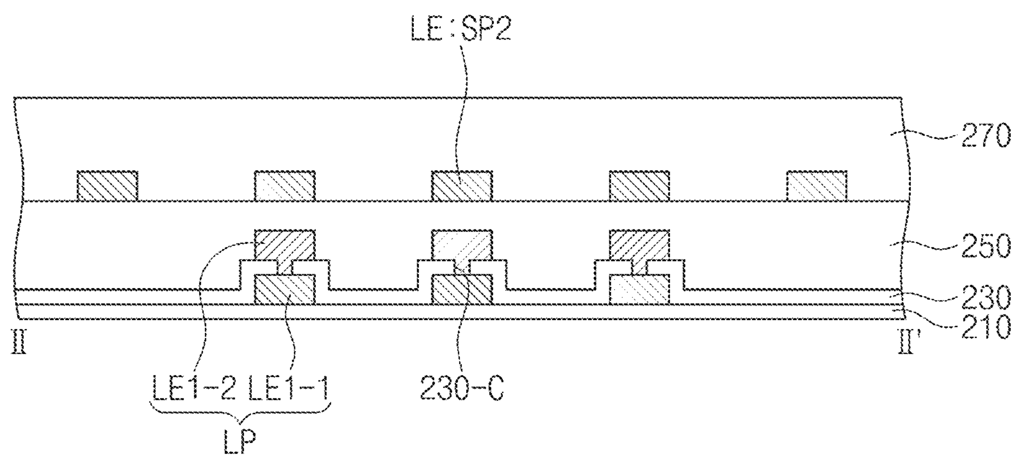
Figure 6G:
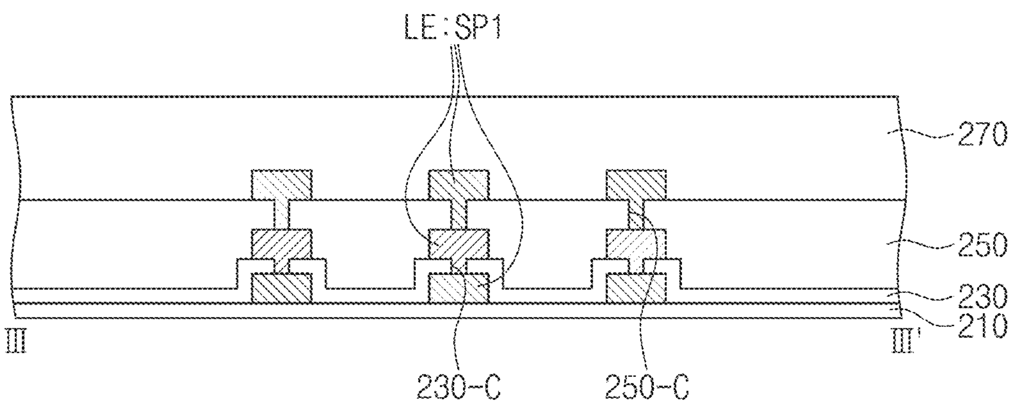
FIG. 6G is a cross-sectional view taken along the line III-III' of FIG. 6A.
Figure 6H:
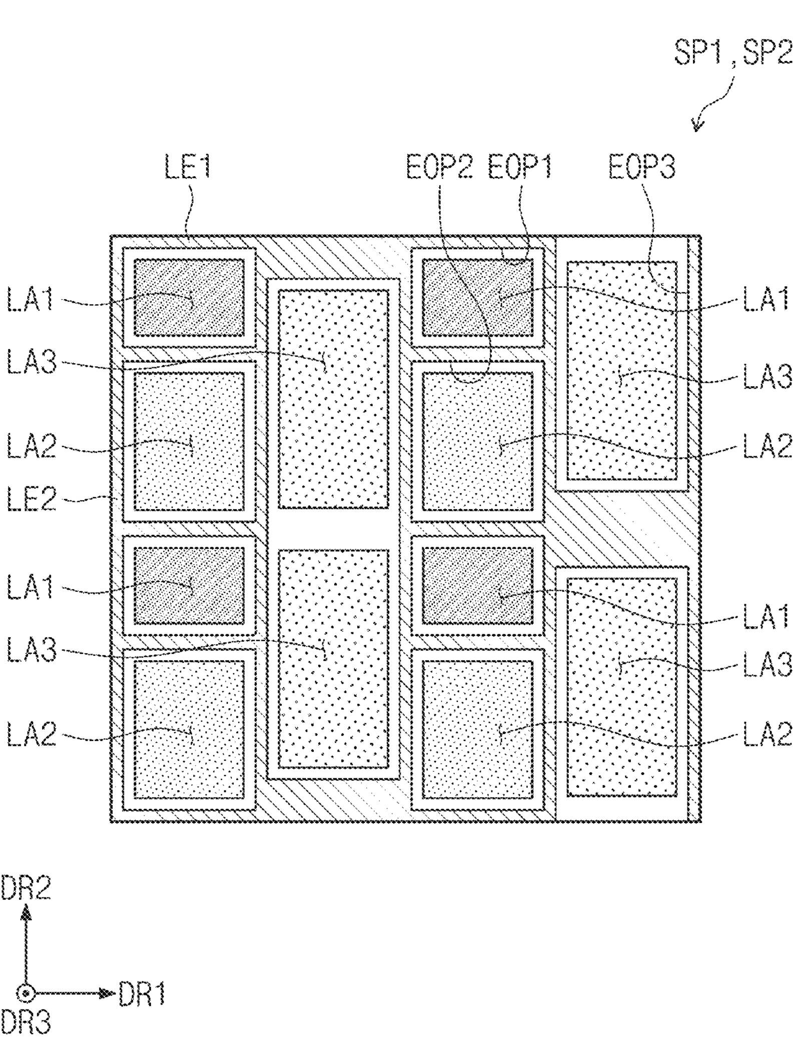
FIG. 6H is an enlarged plan view of a portion of FIG. 6A.

FIG. 6A is an enlarged plan view of a portion of FIG. 5. FIG. 6B is a cross-sectional view taken along the line I-I' of FIG. 6A. FIG. 6C is a cross-sectional view illustrating a short circuit fault between a first conductive pattern and a second conductive pattern. FIG. 6D is a cross-sectional view of a second conductive pattern and a third conductive pattern with no short circuit fault therebetween. FIGS. 6E and 6F are cross-sectional views taken along the line II-II' of FIG. 6A. FIG. 6G is a cross-sectional view taken along the line III-III' of FIG. 6A. FIG. 6H is an enlarged plan view of a portion of FIG. 6A. Hereinafter, the input sensor 200 of FIG. 5 will be described in more detail with reference to FIGS. 6A to 6H.

FIG. 6A illustrates an enlarged plan view of one unit region UA among a plurality of unit regions defined by the first electrodes E1-1 to E1-4 and the second electrodes E2-1 to E2-8. Referring to FIG. 6A, the first electrodes E1-1 to E1-4 and the second electrodes E2-1 to E2-8 may each have a mesh shape in which a plurality of opening regions are defined. The first electrodes E1-1 to E1-4 and the second electrodes E2-1 to E2-8 each include a line component defining the plurality of opening regions. The plurality of opening regions may each overlap (or correspond to), for example, the light-emitting region LA of FIG. 4.

Two sensing patterns SP1, which are spaced apart, of one sensing electrode among the first electrodes E1-1 to E1-4 and bridge patterns CP1 electrically connecting the two sensing patterns SP1 are located in the unit region UA. Two sensing portions SP2, which are spaced apart, of one sensing electrode among the second electrodes E2-1 to E2-8, and an intermediate portion CP2 located between the two sensing portions SP2, are located in the unit region UA. A portion of a line portion LP is located in the unit region UA to overlap the two sensing portions SP2.

In FIG. 6A, the line portion LP is shown by a single thick line so as to be distinguished from the sensing patterns SP1, the bridge patterns CP1, the sensing portions SP2, and the intermediate portion CP2, but one or more embodiments of the present disclosure is not limited thereto. The line portion LP may also have a mesh shape in which a plurality of opening regions are defined. The line portion LP may include a line component defining a plurality of opening regions and may be located to overlap a line component located thereon.

FIG. 6B illustrates three line components LE of the line portion LP located on a base insulating layer 210. An inorganic layer 230 covers the line portion LP. The bridge pattern CP1, which crosses the line components LE of the line portion LP in plan view, is located on the inorganic layer 230. A first organic layer 250 covers the bridge pattern CP1. The sensing patterns SP1, which are connected to the bridge pattern CP1 via a contact hole(s) 250-C penetrating the first organic layer 250, are located on the first organic layer 250. The intermediate portion CP2 is located between regions of the sensing patterns SP1 spaced apart. A second organic layer 270 covers the sensing patterns SP1 and the intermediate portion CP2.

In a case in which a display device, such as a tablet terminal, having a larger area than a mobile terminal is applied, lengths of the first electrodes E1-1 to E1-4 and the second electrodes E2-1 to E2-8 increase, and a load on an electrode increases. An increase in load causes issues, such as RC delay.

Thicknesses of the first electrodes E1-1 to E1-4 and the second electrodes E2-1 to E2-8 may be increased to reduce or prevent such issues. When thicknesses of the first electrodes E1-1 to E1-4 and the second electrodes E2-1 to E2-8 are increased, a step may be formed by the first electrodes E1-1 to E1-4 and the second electrodes E2-1 to E2-8. The first organic layer 250 and the second organic layer 270 are located so as to reduce or prevent the likelihood of a step being formed by the first electrodes E1-1 to E1-4 and the second electrodes E2-1 to E2-8.

The reason why the inorganic layer 230 is used instead of an organic layer is as follows. In a case in which an organic layer is substituted for the inorganic layer 230, the first organic layer 250 and the second organic layer 270 are located on the organic layer. A process of forming or providing the first organic layer 250 and the second organic layer 270 is performed through a wet process. In a case in which a wet process is performed two times after the organic layer is formed, a defect in which the organic layer is deformed may occur. The inorganic layer 230 is used to resolve such issues.

FIG. 6C illustrates a short circuit fault between a first conductive pattern CDP1 and a second conductive pattern CDP2 located with an inorganic layer IOL therebetween. The first conductive pattern CDP1 and the second conductive pattern CDP2 may each include a first metal layer CL1, a second metal layer CL2 located on the first metal layer CL1, and a third metal layer CL3 located on the second metal layer CL2 and including the same material as the first metal layer CL1. The second metal layer CL2 may be thicker than the first metal layer CL1 and the third metal layer CL3. The second metal layer CL2 may have a greater electrical conductivity than the first metal layer CL1 and the third metal layer CL3.

The first metal layer CL1 may be a titanium layer and have a thickness of about 150 Å to about 300 Å. The second metal layer CL2 may be an aluminum layer and have a thickness of about 1500 Å to about 7500 Å. The third metal layer CL3 may be a titanium layer and have a thickness of about 150 Å to about 300 Å.

A three-layered stacked structure of the first conductive pattern CDP1 and the second conductive pattern CDP2 illustrated in FIG. 6C may be equally applied to the first conductive layer 220, the second conductive layer 240, and the third conductive layer 260 illustrated in FIG. 4. That is, the line portion LP of each of the charging electrode CRE, the sensing electrode SE, and the trace line SL illustrated in FIG. 5 may include a conductive pattern that is the same as the three-layered stacked structure of the first conductive pattern CDP1 and the second conductive pattern CDP2.

The inorganic layer IOL of FIG. 6C may correspond to the inorganic layer 230 of FIG. 4, the first conductive pattern CDP1 of FIG. 6C may correspond to the line component LE of the first conductive layer 220 of FIG. 4, and the second conductive pattern CDP2 may correspond to the line component LE of the second conductive layer 240 of FIG. 4.

As described with reference to FIG. 6B, a thickness of the second metal layer CL2 may be increased so as to reduce resistance of the first conductive pattern CDP1 and the second conductive pattern CDP2. The three-layered stacked structure is patterned through the same etching process, and because etch rate is different according to a metal material, the second metal layer CL2 is located more inward than the first metal layer CL1 and the third metal layer CL3 in a plan view and a cross-sectional view as illustrated in FIG. 6C. As a result, the third metal layer CL3 may form a tip structure with respect to the second metal layer CL2.

In this case, a crack CR may occur in the inorganic layer IOL due to the tip structure. Such a crack CR may be a seam phenomenon. A defect in which the first conductive pattern CDP1 and the second conductive pattern CDP2 are short-circuited may occur due to such a crack CR.

According to the present disclosure, as described with reference to FIG. 6B, the first organic layer 250 may suppress a short circuit fault between the bridge pattern CP1 and the intermediate portion CP2. A seam phenomenon does not occur in the first organic layer 250 because of characteristics of a manufacturing process, in which an organic material is formed using a wet process, for the first organic layer 250. This may be confirmed in relationship between a second conductive pattern CDP2 and a third conductive pattern CDP3 illustrated in FIG. 6D. In FIG. 6D, the first organic layer 250 is illustrated as an organic layer OL.

Referring to FIG. 6E, only a line component LE of the sensing portion SP2 or the sensing pattern SP1 is located in most of the unit region UA except for a region in which the bridge pattern CP1 and the intermediate portion CP2 cross each other. A line component LE of the line portion LP overlapping the component LE of the sensing portion SP2 or the sensing pattern SP1 is located in a partial region.

Referring to FIG. 6F, the line portion LP according to one or more embodiments of the present disclosure may include a (1-1)-th line component LE1-1 located on the base insulating layer 210, and a (1-2)-th line component LE1-2 located on the inorganic layer 230. A corresponding (1-1)-th line component LE1-1 and a corresponding (1-2)-th line component LE1-2 may be connected via a corresponding contact hole 230-C penetrating the inorganic layer 230. Even if the short circuit fault described with reference to FIG. 6C occurs, the short circuit does not cause an issue because the (1-1)-th line component LE1-1 and the (1-2)-th line component LE1-2 receive the same signal.

FIG. 6G is a cross-sectional view taken along the line III-III' of FIG. 6A. FIG. 6G illustrates the sensing pattern SP1 including the line component LE of the first conductive layer 220, the line component LE of the second conductive layer 240, and the line component LE of the third conductive layer 260 illustrated in FIG. 4. A corresponding line component LE of the first conductive layer 220 and a corresponding line component LE of the second conductive layer 240 may be connected via a corresponding contact hole 230-C penetrating the inorganic layer 230, and the corresponding line component LE of the second conductive layer 240 and a corresponding line component LE of the third conductive layer 260 may be connected via a contact hole 250-C penetrating the first organic layer 250. In one or more embodiments of the present disclosure, at least one of the line component LE of the first conductive layer 220 or the line component LE of the second conductive layer 240 may be omitted.

The sensing portion SP2 may also include the line component LE of the first conductive layer 220, the line component LE of the second conductive layer 240, and the line component LE of the third conductive layer 260 illustrated in FIG. 4, but is not limited thereto. In one or more embodiments of the present disclosure, at least one of the line component LE of the first conductive layer 220 or the line component LE of the second conductive layer 240 of the sensing portion SP2 may be omitted.

FIG. 6H illustrates a mesh shape of the sensing pattern SP1 and the sensing portion SP2.

The light-emitting region LA illustrated in FIG. 4 may have a different area and a different shape according to the pixels PX illustrated in FIG. 3B. A first light-emitting region LA1, a second light-emitting region LA2, and a third light-emitting region LA3 having different areas may be located in accordance with a corresponding rule in the display region 100-DA illustrated in FIG. 3B.

A line component LE may define a first opening region EOP1, a second opening region EOP2, and a third opening region EOP3 respectively corresponding to the first light-emitting region LA1, the second light-emitting region LA2, and the third light-emitting region LA3. The first opening region EOP1, the second opening region EOP2, and the third opening region EOP3 each have a larger area than a corresponding light-emitting region LA1, LA2, or LA3. The first opening region EOP1 may have the smallest area, and the third opening region EOP3 may have the largest area. The third opening region EOP3 may substantially correspond to two third light-emitting regions LA3 adjacent in the second direction DR2.

The line component LE may include a first line component LE1 extending in the first direction DR1 and a second line component LE2 extending in the second direction DR2. The first line component LE1 and the second line component LE2 having a constant line width are illustrated, but the present disclosure is not limited thereto. The first opening region EOP1, the second opening region EOP2, and the third opening region EOP3 may be each defined by two first line components LE1 and two second line components LE2.

Figure 7A:
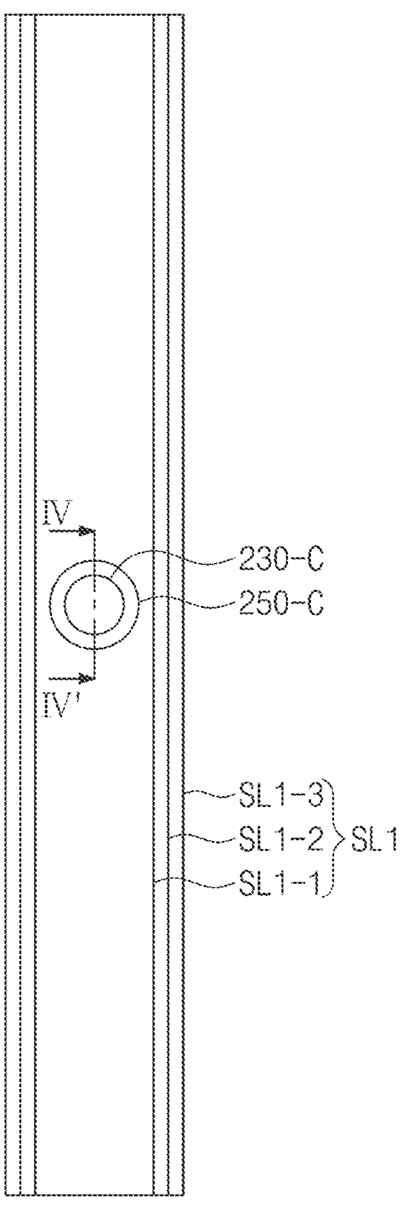
FIG. 7A is an enlarged plan view of a portion of FIG. 5.
Figure 7B:
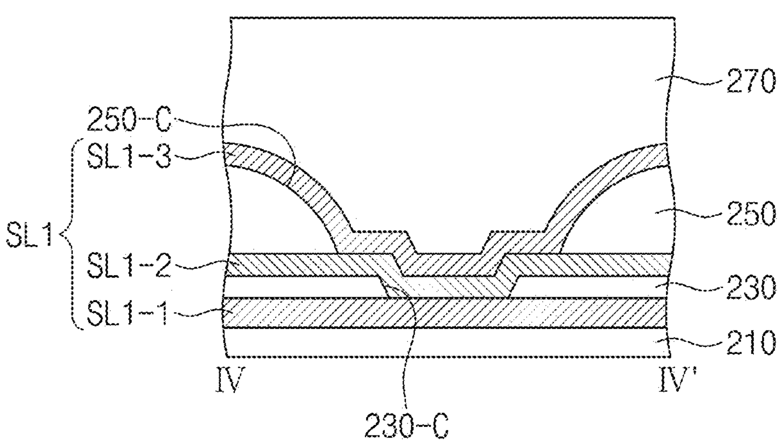
FIG. 7B is a cross-sectional view taken along the line IV-IV' of FIG. 7A.
Figure 8A:
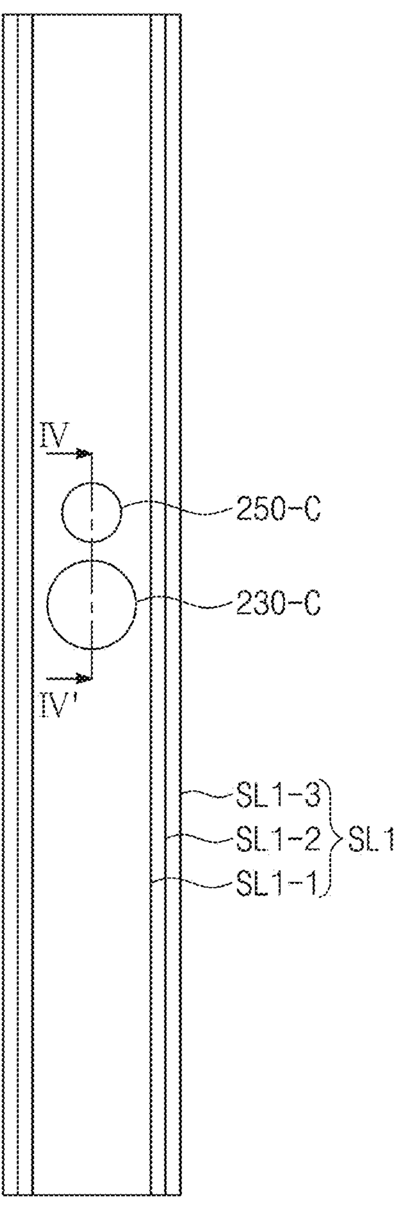
FIG. 8A is an enlarged plan view of a portion of FIG. 5.
Figure 8B:
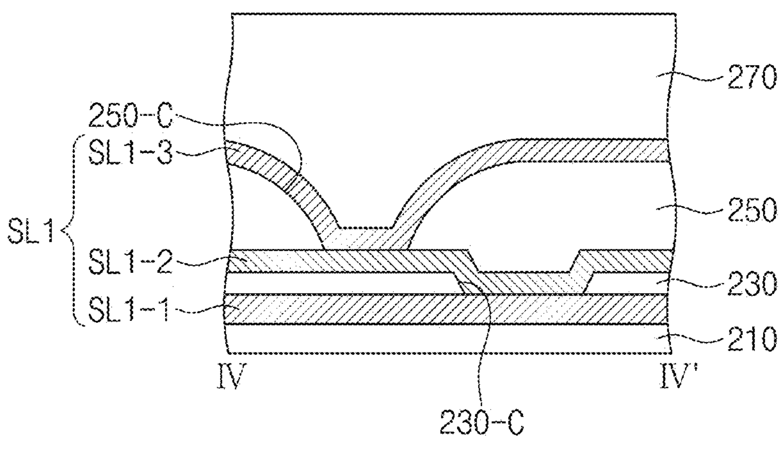
FIG. 8B is a cross-sectional view taken along the line IV-IV' of FIG. 8A.
Figure 9A:
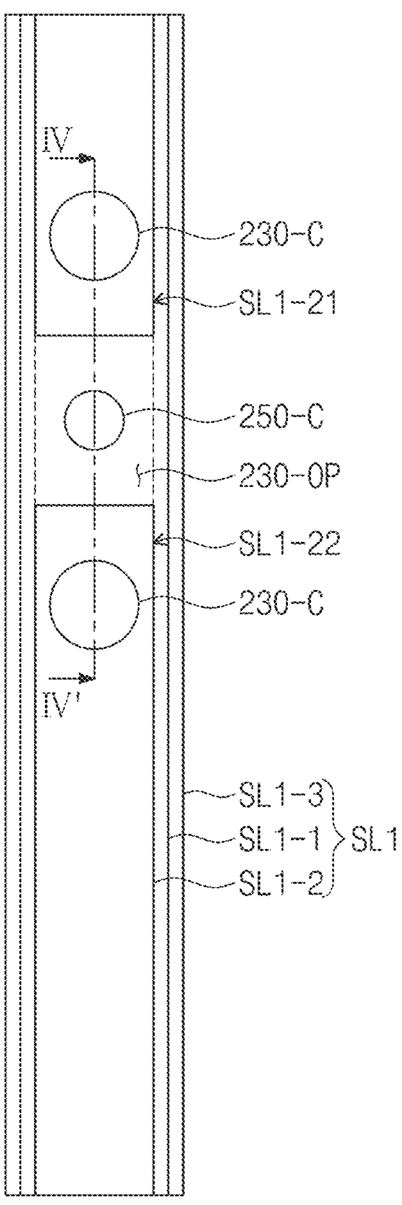
FIG. 9A is an enlarged plan view of a portion of FIG. 5.
Figure 9B:
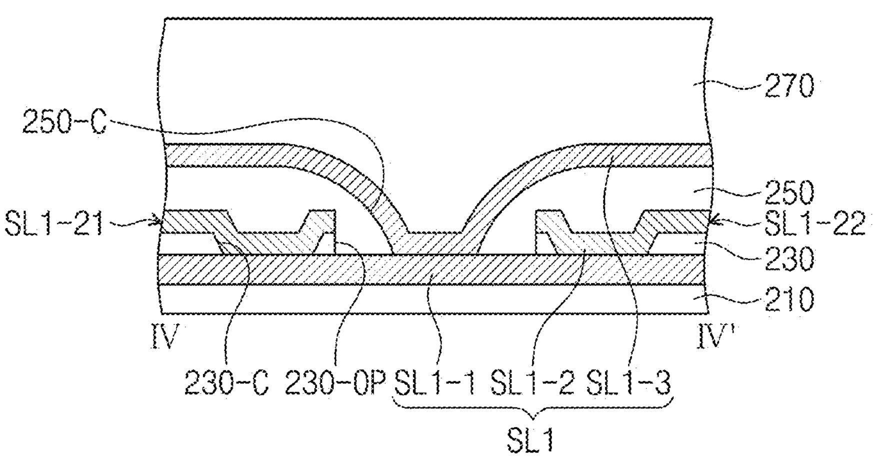
FIG. 9B is a cross-sectional view taken along the line IV-IV' of FIG. 9A.

FIG. 7A is an enlarged plan view of a portion of FIG. 5. FIG. 7B is a cross-sectional view taken along the line IV-IV' of FIG. 7A. FIG. 8A is an enlarged plan view of a portion of FIG. 5. FIG. 8B is a cross-sectional view taken along the line IV-IV' of FIG. 8A. FIG. 9A is an enlarged plan view of a portion of FIG. 5. FIG. 9B is a cross-sectional view taken along the line IV-IV' of FIG. 9A.

FIGS. 7A to 9B may illustrate a portion of the trace line SL illustrated in FIG. 5. A connection region illustrated in FIGS. 7A to 9B may be located in plurality in the trace line SL. In other words, the first trace lines SL1, the second trace lines SL2, and the third trace lines SL3 may each include the connection region illustrated in FIGS. 7A to 9B in plurality. Hereinafter, a trace line SL illustrated in FIGS. 7A to 9B will be described as a first trace line SL1.

Referring to FIGS. 7A and 7B, a first trace line SL1 may include a (1-1)-th line portion SL1-1 located below an inorganic layer 230, a (1-2)-th line portion SL1-2 located between the inorganic layer 230 and a first organic layer 250 and electrically connected to the (1-1)-th line portion SL1-1, and a (1-3)-th line portion SL1-3 located between the first organic layer 250 and a second organic layer 270 and electrically connected to the (1-2)-th line portion SL1-2. The (1-1)-th line portion SL1-1, the (1-2)-th line portion SL1-2, and the (1-3)-th line portion SL1-3 may each include the first metal layer CL1, the second metal layer CL2, and the third metal layer CL3 as illustrated in FIG. 6C. FIG. 7A illustrates that the (1-1)-th to (1-3)-th line portions SL1-1, SL1-2, and SL1-3 have different line widths (e.g., in plan view) so as to be distinguished from each other, but one or more embodiments of the present disclosure is not limited thereto.

The (1-1)-th line portion SL1-1 and the (1-2)-th line portion SL1-2 are connected via a contact hole 230-C penetrating the inorganic layer 230. The (1-2)-th line portion SL1-2 and the (1-3)-th line portion SL1-3 are connected via a contact hole 250-C penetrating the first organic layer 250. The contact hole 250-C penetrating the first organic layer 250 may overlap the contact hole 230-C penetrating the inorganic layer 230 in a plan view.

The three line portions SL1-1, SL1-2, and SL1-3 may be electrically connected to each other, and may reduce resistance of the first trace line SL1.

Because resistance of the first trace line SL1 is reduced, resistance of a charging channel defined by the first trace line SL1 and the line portions LP is reduced.

Because resistance of the charging channel is reduced, an induced magnetic field having a great intensity may be generated.

In one or more embodiments, the second trace line SL2 may include a (2-1)-th line portion, a (2-2)-th line portion, and a (2-3)-th line portion respectively corresponding to the (1-1)-th line portion SL1-1, the (1-2)-th line portion SL1-2, and the (1-3)-th line portion SL1-3. In addition, the electrostatic discharge line ESD described with reference to FIG. 5 may also include at least two line portions among the (1-1)-th to (1-3)-th line portions SL1-1 to SL1-3 illustrated in FIGS. 7A and 7B.

A first trace line SL1 illustrated in FIGS. 8A and 8B has a different arrangement relationship of a contact hole 250-C penetrating the first organic layer 250 and a contact hole 230-C penetrating the inorganic layer 230 from that of the first trace line SL1 described with reference to FIGS. 7A and 7B. Referring to FIGS. 8A and 8B, the contact hole 250-C penetrating the first organic layer 250 may not overlap (e.g., may be separated from, in plan view) the contact hole 230-C penetrating the inorganic layer 230 and may be located to be spaced apart from the contact hole 230-C in a plan view.

A first trace line SL1 illustrated in FIGS. 9A and 9B may include a plurality of (1-2)-th line portions SL1-2 located to be spaced apart in a plan view. FIG. 9A illustrates a (1-2)-th line portion SL1-21 located on an upper side and a (1-2)-th line portion SL1-22 located on a lower side. An opening region 230-OP of the inorganic layer 230 may be defined in a spaced region between the (1-2)-th line portion SL1-21 located on an upper side and the (1-2)-th line portion SL1-22 located on a lower side.

The (1-2)-th line portion SL1-21 located on an upper side and the (1-2)-th line portion SL1-22 located on a lower side may each be connected to a (1-1)-th line portion SL1-1 via a contact hole 230-C penetrating the inorganic layer 230.

A (1-3)-th line portion SL1-3 may be connected to the (1-1)-th line portion SL1-1 via a contact hole 250-C penetrating the first organic layer 250. The contact hole 250-C penetrating the first organic layer 250 may be located in the opening region 230-OP of the inorganic layer 230.

Figure 10A:
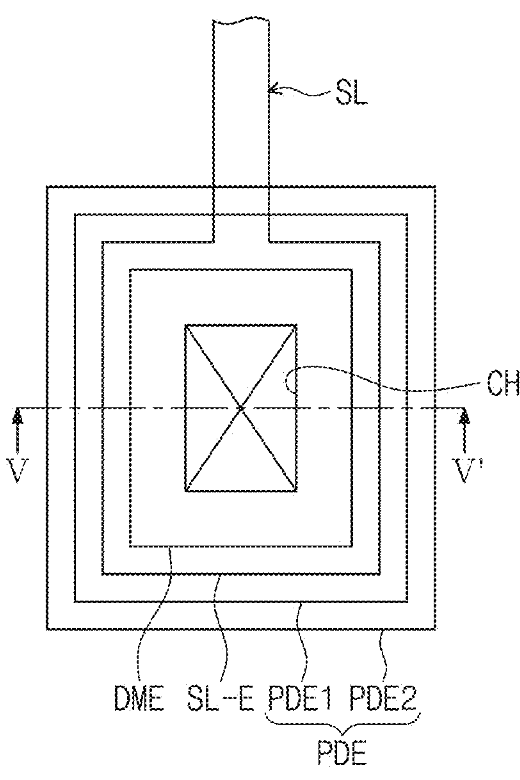
FIG. 10A is an enlarged plan view of a portion of FIG. 5.
Figure 10B:
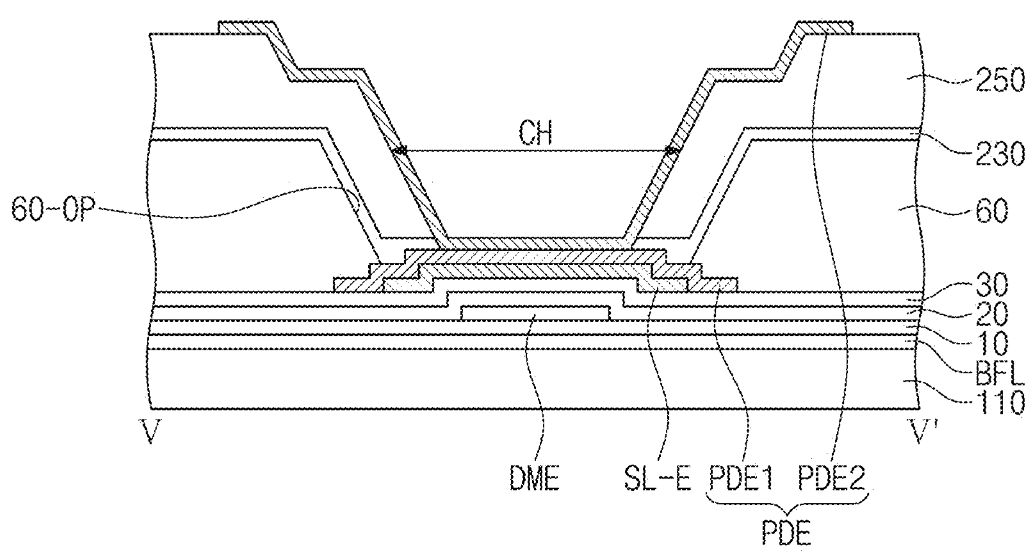
FIG. 10B is a cross-sectional view taken along the line V-V' of FIG. 10A.

FIG. 10A is an enlarged plan view of a portion of FIG. 5. FIG. 10B is a cross-sectional view taken along the line V-V' of FIG. 10A.

FIGS. 10A and 10B illustrate an enlarged view of the pad electrode PDE of FIG. 5. The pad electrode PDE may be electrically connected to an end portion SL-E of a corresponding trace line SL.

The end portion SL-E of the trace line SL may be located on the same layer as the first connection electrode CNE1 of FIG. 4. The end portion SL-E of the trace line SL may be formed or provided through the same process as that for the first connection electrode CNE1 of FIG. 4.

Most of the trace line SL illustrated in FIG. 5 is configured with first to third line portions SL1-1, SL1-2, and SL1-3, which are formed from the first conductive layer 220, the second conductive layer 240, and the third conductive layer 260 of FIG. 4, as illustrated in FIGS. 7A to 9B.

The trace line SL may be changed from the first to third line portions SL1-1, SL1-2, and SL1-3 to the end portion SL-E illustrated in FIGS. 10A and 10B in a region adjacent to the pad electrode PDE. That is, the trace line SL may include a portion configured with the first to third line portions SL1-1, SL1-2, and SL1-3 and the end portion SL-E connected thereto.

A dummy electrode DME, which may be formed or provided through the same process as that for the gate GT of FIG. 4, may be located below the end portion SL-E. The dummy electrode DME may be omitted or connected to the end portion SL-E.

The pad electrode PDE may include a first conductive pattern PDE1 and a second conductive pattern PDE2. The first conductive pattern PDE1 is directly located on the end portion SL-E of the trace line SL. The second conductive pattern PDE2 may be connected to the first conductive pattern PDE1 via a contact hole CH penetrating an inorganic layer 230 and a first organic layer 250.

A sixth insulating layer 60 may be located between the first conductive pattern PDE1 and the second conductive pattern PDE2. An opening region 60-OP corresponding to the contact hole CH may be defined in the sixth insulating layer 60. The inorganic layer 230, the first organic layer 250, and the contact hole CH are located in the opening region 60-OP.

In one or more embodiments of the present disclosure, the base insulating layer 210 may be further located between the first conductive pattern PDE1 and the second conductive pattern PDE2, and the contact hole CH may further penetrate the base insulating layer 210. In addition, an additional insulating layer may be further located between the sixth insulating layer 60 and a third insulating layer 30.

The pad electrode PD described with reference to FIG. 3A may also have a structure of a cross section illustrated in FIGS. 10A and 10B. A signal line connecting the pad electrode PD and the driving chip DIC of FIG. 3A may be located on the same layer as the end portion SL-E of the trace line SL of FIG. 10B. The pad electrode PD may also include the first conductive pattern PDE1 and the second conductive pattern PDE2 of FIG. 10B. In this case, the pad electrode PD of the display panel 100 (see FIG. 3B) and the pad electrode PDE of the input sensor 200 (see FIG. 5) may be connected to the same circuit board. Because the pad electrode PD and the pad electrode PDE have similar structures, the pad electrode PD and the pad electrode PDE may be bonded to the circuit board without a defect.

According to the above descriptions, not only an input from a user's body, but also an input from a pen, may be sensed. An input from a user's body may be sensed by using a capacitive method, and an input from a passive type pen may be sensed by using an electromagnetic induction method.

A degree of freedom in designing a charging electrode is improved because the charging electrode is located on/at a different layer from that of an input sensor. Charging efficiency of the charging electrode may be improved by applying a signal line having a multi-layered structure because it is possible to form or provide an induced magnetic field having great strength.

Although description has been made with reference to embodiments of the present disclosure, it is understood that the present disclosure should not be limited to these embodiments, but various changes and modifications may be made by one ordinary skilled in the art within the spirit and scope of the present disclosure as hereinafter claimed.

Therefore, the technical scope of the present disclosure is not limited to the contents described in the detailed description of the specification, but should be determined by the accompanying claims.

What is claimed is:

1. A display device comprising:
- a display panel; and
- an input sensor above the display panel, and comprising:
  - a charging electrode in a sensing region, and configured to generate an induced magnetic field;
  - a first trace line in a peripheral region adjacent to the sensing region, and electrically connected to the charging electrode;
  - an inorganic layer covering the charging electrode;
  - a first organic layer above the inorganic layer;
  - a sensing electrode in the sensing region above the inorganic layer; and
  - a second organic layer above the first organic layer, and overlapping the sensing electrode,
- wherein the first trace line comprises:
  - a (1-1)-th line portion below the inorganic layer;
  - a (1-2)-th line portion between the inorganic layer and the first organic layer, and electrically connected to the (1-1)-th line portion; and
  - a (1-3)-th line portion between the first organic layer and the second organic layer, and electrically connected to the (1-2)-th line portion.

2. The display device of claim 1, wherein at least one of the (1-1)-th line portion, the (1-2)-th line portion, or the (1-3)-th line portion comprises:
- a first metal layer;
- a second metal layer above the first metal layer, and thicker than the first metal layer; and
- a third metal layer above the second metal layer, thinner than the second metal layer, and comprising a same material as the first metal layer.

3. The display device of claim 2, wherein the second metal layer is narrower than the first metal layer and the third metal layer in a plan view.

4. The display device of claim 1, wherein the sensing electrode comprises:
- first electrodes extending in a first direction, and arranged in a second direction crossing the first direction; and
- second electrodes extending in the second direction, and arranged in the first direction, and
- wherein the charging electrode comprises line portions respectively overlapping the second electrodes.

5. The display device of claim 4, wherein the charging electrode further comprises a connection portion connecting first ends of the line portions, and
- wherein the first trace line is provided in plurality, the first trace lines respectively connected to second ends of the line portions.

6. The display device of claim 4, wherein the input sensor further comprises:
- (2-2)-th trace lines respectively connected to second ends of the first electrodes; and
- (2-1)-th trace lines respectively connected to first ends of the first electrodes, and comprising:
  - a (2-1)-th line portion below the inorganic layer;
  - a (2-2)-th line portion between the inorganic layer and the first organic layer and connected to the (2-1)-th line portion; and a (2-3)-th line portion between the first organic layer and the second organic layer, and electrically connected to the (2-2)-th line portion.

7. The display device of claim 6, wherein the (2-1)-th line portion and the (2-2)-th line portion are connected via a first contact hole penetrating the inorganic layer, and wherein the (2-2)-th line portion and the (2-3)-th line portion are connected via a second contact hole penetrating the first organic layer.

8. The display device of claim 7, wherein the first contact hole and the second contact hole are separated in plan view.

9. The display device of claim 4, wherein the input sensor further comprises:

(2-2)-th trace lines respectively connected to second ends of the first electrodes; and (2-1)-th trace lines respectively connected to first ends of the first electrodes, and comprising:

a (2-1)-th line portion below the inorganic layer;

a (2-2)-th line portion between the inorganic layer and the first organic layer, and connected to the (2-1)-th line portion; and a (2-3)-th line portion between the first organic layer and the second organic layer, and connected to the (2-1)-th line portion.

10. The display device of claim 4, wherein the input sensor further comprises third signal lines respectively connected to one end of the second electrodes.

11. The display device of claim 1, wherein the input sensor further comprises an electrostatic discharge line in the peripheral region, and comprising line portions at different respective layers and electrically connected to each other.

12. The display device of claim 1, wherein the display panel comprises light-emitting regions, and a non-light-emitting region adjacent to the light-emitting regions, and wherein openings corresponding to the light-emitting regions are defined in the sensing electrode.

13. The display device of claim 1, further comprising a pad electrode electrically connected to an end portion of the first trace line, and comprising:

a first conductive pattern directly on the end portion of the first trace line; and a second conductive pattern connected to the first conductive pattern via a contact hole penetrating the inorganic layer and the first organic layer, and wherein the inorganic layer and the first organic layer are between the first conductive pattern and the second conductive pattern.

14. The display device of claim 1, wherein the charging electrode comprises:

a (1-1)-th line component below the inorganic layer; and a (1-2)-th line component between the inorganic layer and the first organic layer, and electrically connected to the (1-1)-th line component.

15. The display device of claim 1, wherein the sensing electrode comprises:

first electrodes extending in a first direction and arranged in a second direction crossing the first direction; and second electrodes extending in the second direction, arranged in the first direction, having an integrated shape, and having a length that is less than a length of the first electrodes, wherein each of the first electrodes comprises:

sensing portions between the first organic layer and the second organic layer; and connection portions between the inorganic layer and the first organic layer, and connecting adjacent ones of the sensing portions.

16. A display device comprising:

a display panel; and an input sensor above the display panel, and comprising:

a charging electrode in a sensing region, and configured to generate an induced magnetic field;

an inorganic layer covering the charging electrode;

a first organic layer above the inorganic layer;

a sensing electrode in the sensing region above the inorganic layer;

a second organic layer above the first organic layer, and covering the sensing electrode; and a trace line in a peripheral region adjacent to the sensing region, electrically connected to a corresponding electrode among the charging electrode and the sensing electrode, and comprising:

a (1-1)-th line portion below the inorganic layer;

a (1-2)-th line portion between the inorganic layer and the first organic layer, and electrically connected to the (1-1)-th line portion; and a (1-3)-th line portion between the first organic layer and the second organic layer, and electrically connected to the (1-2)-th line portion.

17. The display device of claim 16, wherein each of the (1-1)-th line portion and the (1-2)-th line portion comprises:

a first metal layer;

a second metal layer above the first metal layer; and a third metal layer above the second metal layer, and comprising a same material as the first metal layer, wherein the second metal layer is thicker than the first metal layer and the third metal layer, and wherein the second metal layer is narrower than the first metal layer and the third metal layer in a plan view.

18. The display device of claim 16, wherein the sensing electrode comprises:

first electrodes extending in a first direction, and arranged in a second direction crossing the first direction; and second electrodes extending in the second direction, and arranged in the first direction, and wherein the charging electrode comprises line portions respectively overlapping the second electrodes.

19. An electronic device comprising:

an input means; and a display device comprising:

a display panel, and an input sensor above the display panel, and comprising:

a charging electrode in a sensing region, and configured to generate an induced magnetic field for charging the input means;

a first trace line in a peripheral region adjacent to the sensing region, and electrically connected to the charging electrode;

an inorganic layer covering the charging electrode;

a first organic layer above the inorganic layer;

a sensing electrode in the sensing region above the inorganic layer; and a second organic layer above the first organic layer, and covering the sensing electrode, and wherein the first trace line comprises:

a (1-1)-th line portion below the inorganic layer;

a (1-2)-th line portion between the inorganic layer and the first organic layer, and electrically connected to the (1-1)-th line portion; and a (1-3)-th line portion between the first organic layer and the second organic layer, and electrically connected to the (1-2)-th line portion.

20. The electronic device of claim 19, wherein the input means comprises an RLC resonant circuit configured to be charged by the induced magnetic field.

* * * * *